(12) United States Patent
Guim Bernat et al.

(10) Patent No.: US 12,461,828 B2
(45) Date of Patent: Nov. 4, 2025

(54) NETWORK INTERFACE DEVICE MANAGEMENT OF SERVICE EXECUTION FAILOVER

(71) Applicant: Intel Corporation, Santa Clara, CA (US)

(72) Inventors: Francesc Guim Bernat, Barcelona (ES); Karthik Kumar, Chandler, AZ (US); Alexander Bachmutsky, Sunnyvale, CA (US); Patrick G. Kutch, Tigard, OR (US); Marcos E. Carranza, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 17/359,530

(22) Filed: Jun. 26, 2021

(65) Prior Publication Data

US 2021/0326221 A1 Oct. 21, 2021

(51) Int. Cl.
*G06F 11/30* (2006.01)
*G06F 9/48* (2006.01)
*G06F 11/20* (2006.01)

(52) U.S. Cl.
CPC ........ *G06F 11/2007* (2013.01); *G06F 9/4856* (2013.01); *G06F 2201/85* (2013.01)

(58) Field of Classification Search
CPC .......................... G06F 11/0757; G06F 11/3419
See application file for complete search history.

(56) References Cited

U.S. PATENT DOCUMENTS

2017/0177396 A1 6/2017 Palermo et al.
2017/0337492 A1* 11/2017 Chen ................. G06Q 10/0633
(Continued)

FOREIGN PATENT DOCUMENTS

WO 2020226979 A2 11/2020

OTHER PUBLICATIONS

"HDFS Architecture", Version 2.6.4, the Apache Software Foundation, https://hadoop.apache.org/docs/r2.6.4/hadoop-project-dist/hadoop-hdfs/HdfsDesign.html, last published Feb. 12, 2016, 7 pages.
(Continued)

*Primary Examiner* — Brian W Wathen
(74) *Attorney, Agent, or Firm* — Compass IP Law PC

(57) ABSTRACT

Examples described herein relate to a network interface device that comprises circuitry, when operational, to select a platform to execute a function and based on load of the platform, selectively cause the function to execute on one or more other platforms to attempt to achieve or finish before the time-to-completion. In some examples, the circuitry is to detect progress of function execution to determine whether completion of execution of the function is predicted to not finish within the time-to-completion and cause the function to execute on one or more other platforms based on completion of execution of the function predicted to not finish within the time-to-completion. In some examples, the circuitry is to select the one or more other platforms to execute the function based on one or more of: processor computing utilization, available memory capacity, available cache capacity, network availability, or malfunction of a processor, memory, and/or cache.

20 Claims, 16 Drawing Sheets

(56) References Cited

U.S. PATENT DOCUMENTS

| | | | |
|---|---|---|---|
| 2018/0150298 A1* | 5/2018 | Balle | G06F 11/3409 |
| 2019/0324992 A1* | 10/2019 | Bingham | G06F 16/90335 |
| 2020/0225983 A1* | 7/2020 | Jung | G06F 9/5027 |
| 2020/0259706 A1 | 8/2020 | Romano et al. | |
| 2020/0409755 A1 | 12/2020 | Macnamara et al. | |
| 2021/0004258 A1 | 1/2021 | Liu et al. | |
| 2021/0405915 A1* | 12/2021 | Agarwal | G06F 3/0604 |
| 2022/0164233 A1* | 5/2022 | Nagar | G06F 9/5027 |

OTHER PUBLICATIONS

"HDFS Architecture", Version 3.1.0, the Apache Software Foundation, https://hadoop.apache.org/docs/r3.1.0/hadoop-project-dist/hadoop-hdfs/HdfsDesign.html, last published Mar. 30, 2018, 8 pages.

International Search Report and Written Opinion for PCT Patent Application No. PCT/US22/22028, Mailed Jun. 30, 2022, 11 pages.

* cited by examiner

NETWORK INTERFACE DEVICE MANAGEMENT OF SERVICE EXECUTION FAILOVER

BACKGROUND

Rapid proliferation of cloud native usages has resulted in a shift to scale out, distributed software design. For example, an application or service can be executed using a group of microservices and microservices can communicate with other microservices using a network. A service mesh can provide communications between microservices. Functions can also be ordered for execution as part of a service function chain (SFC). In particular, as services run in these kind of scenarios, the infrastructure around these has evolved to include abstractions to define now they can be deployed across multiple sets of nodes, via control and data planes. Example frameworks include Istio, Amazon Web Service (AWS) app mesh, and so forth.

Various industry trends have led to a proliferation in cloud and edge based computing, where clusters of server machinery in data centers service various tasks and requests. There are also a variety in the types of tasks executed in these data centers, from task complexity to task duration including the capability to predict how long a task may occupy compute resources. For a complex scale-out application executing on multiple servers, the current approach is for application software (or manual intervention) to handle distribution of work between multiple servers, while the operating system handles distribution of work between multiple cores and sockets within a server.

However, several emerging data center trends add complexity to this conventional approach. As data centers become larger, the scale in terms of number of servers has become so large that factors that were not a large concern earlier come more into focus. With current cloud scales, issues of a central processing unit (CPU) hang or stall or memory errors become a non-trivial concern with millions of CPUs and Exabytes of total memory across a data center.

The range and complexity of applications vary widely, and mapping of tasks onto a distributed set of servers becomes a problem domain in itself. Complex distributed applications that leverage Hadoop or Spark and scale across hundreds of nodes, utilize application software-based heartbeat mechanisms to account for machine/server/node failures in the middle of execution of a task. Unfortunately, current and emerging application design has undergone a sharp deviation from large, monolithic applications like Hadoop or Spark where there is a clear central control node that implements this heartbeat to microservice-based architectures, where there is a large distribution of small tasks that are often short-lived, and challenging for a remote application to track via heartbeats. An application executing on a remote server may not be able to track functions for component failures.

DETAILED DESCRIPTION

Emerging architectures like function as a service (FaaS) and microservice architectures involve executing multitudes of short-lived functions that communicate with each other to collectively perform tasks. A network interface device can detect progress of service execution to completion or whether the completion of service execution is delayed and the network interface device can selectively cause the service to be executed on another computing device to attempt to satisfy service level agreement (SLA) parameter that indicates a time to complete execution of the service and/or time to provide data generated by the execution of the service for storage in memory or for transmission to another node. Progress of service execution can be affected by processor computing utilization, available memory capacity, available cache capacity, or malfunction of a processor, memory, and/or cache. In some examples, registers or memory locations can identify an operating state of a processor, memory, and/or cache that executes a service and/or progress indicator such as progress-to-completion indicator. Based on detecting that a service will not complete execution within a time-to-completion associated with the service based on the operating state and/or progress-to-completion indicator, the network interface device can select on another computing device in a same node or on a computing device in a different node where the service is likely to be completed within a time to completion and cause the service to be executed on another computing device in a same node or on a computing device in a different node. The time to completion of the service on a computing device in a different node can include packet transit time through a network to the different node. The network interface device can receive utilization levels of computing, networking and memory resources of different nodes and can use the network interface device can determine which computing resources to execute the service based on the utilization levels of computing, networking and memory resources of different nodes. The network interface device can be implemented as one or more of: network interface controller (NIC), SmartNIC, router, switch, forwarding element, infrastructure processing unit (IPU), or data processing unit (DPU). Note that reference to microservice, application, function, process, routine, or service can be used interchangeably such that reference to one can refer to one or more of a microservice, application, function, process, routine, or service.

Figure 1:
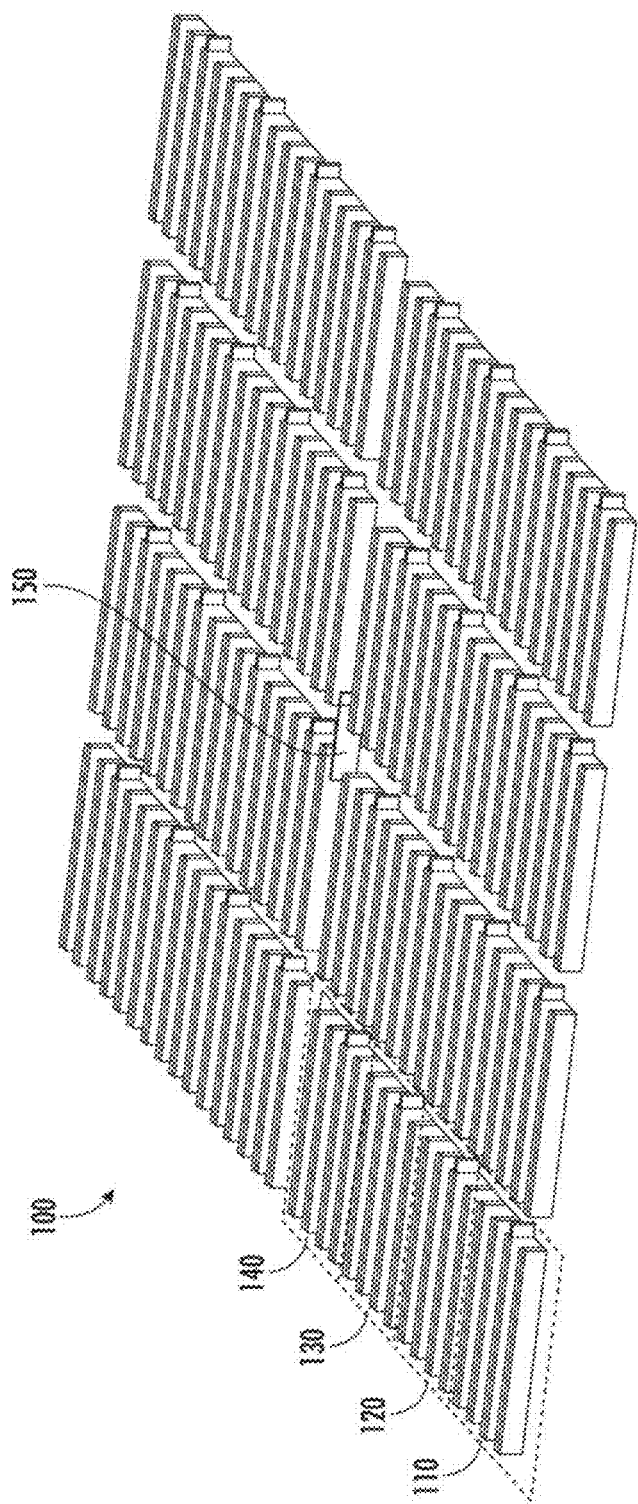
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) that includes multiple systems 110, 120, 130, 140, a system being or including one or more rows of racks or trays. Of course, although data center 100 is shown with multiple systems, in some embodiments, the data center 100 may be embodied as a single system. As described in more detail herein, each rack houses multiple nodes, some of which may be equipped with one or more types of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node, which can act as, for example, a server to perform a job, workload or microservices.

Various examples described herein can perform an application composed of microservices, where each microservice runs in its own process and communicates using protocols (e.g., application program interface (API), a Hypertext Transfer Protocol (HTTP) resource API, message service, remote procedure calls (RPC), or Google RPC (gRPC)). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery.

In the illustrative embodiment, the nodes in each system 110, 120, 130, 140 are connected to multiple system switches (e.g., switches that route data communications to and from nodes within the system). Switches can be positioned at the top of rack (TOR), end of row (EOR), middle of rack (MOR), or other. The system switches, in turn, connect with spine switches 150 that switch communications among systems (e.g., the systems 110, 120, 130, 140) in the data center 100. In some embodiments, the nodes may be connected with a fabric using standards described herein or proprietary standards. In other embodiments, the nodes may be connected with other fabrics, such as InfiniBand or Ethernet or optical. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 120, 130, 140. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resource types (processors, memory, storage, accelerators, etc.) typically have different refresh rates, greater resource utilization, and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
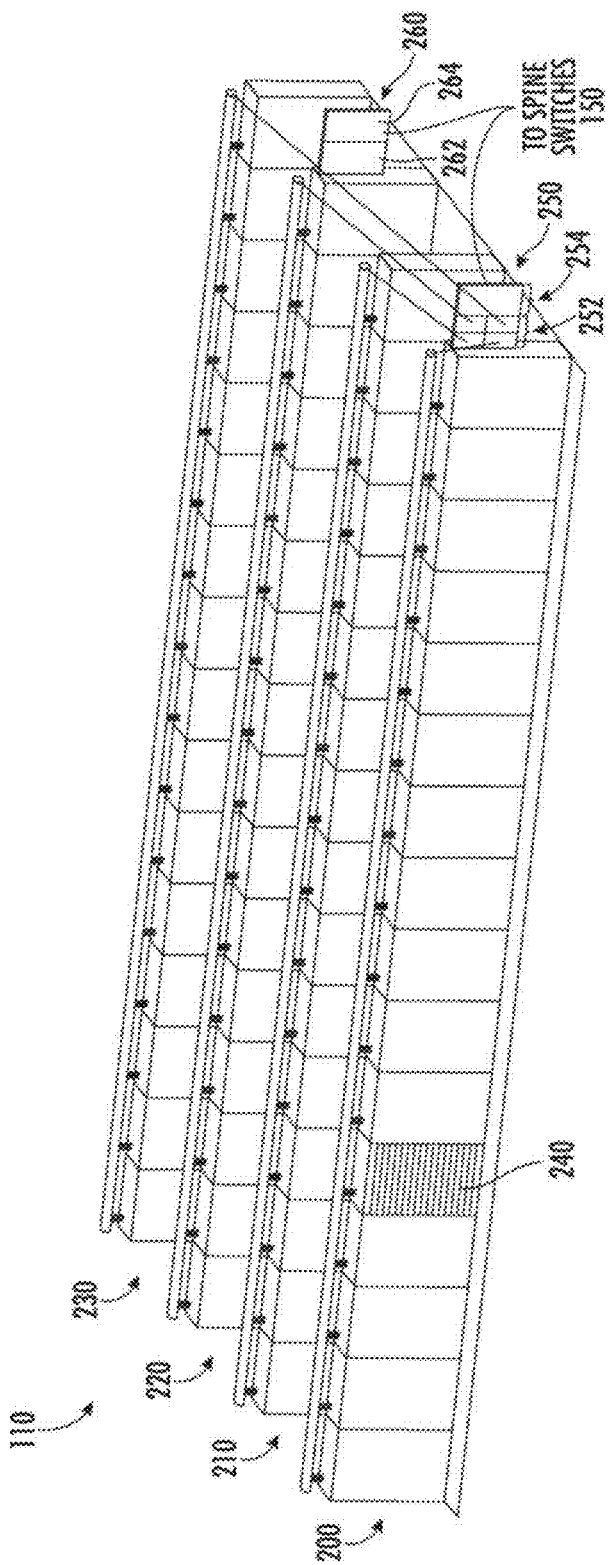
FIG. 2 is a simplified diagram of at least one embodiment of a system that may be included in a data center.

FIG. 2 depicts a system. A system can include a set of rows 200, 210, 220, 230 of racks 240. Each rack 240 may house multiple nodes (e.g., sixteen nodes) and provide power and data connections to the housed nodes, as described in more detail herein. In the illustrative embodiment, the racks in each row 200, 210, 220, 230 are connected to multiple system switches 250, 260. The system switch 250 includes a set of ports 252 to which the nodes of the racks of the system 110 are connected and another set of ports 254 that connect the system 110 to the spine switches 150 to provide connectivity to other systems in the data center 100. Similarly, the system switch 260 includes a set of ports 262 to which the nodes of the racks of the system 110 are connected and a set of ports 264 that connect the system 110 to the spine switches 150. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that each of the other systems 120, 130, 140 (as well as additional systems of the data center 100) may be similarly structured as, and have components similar to, the system 110 shown in and described in regard to FIG. 2 (e.g., each system may have rows of racks housing multiple nodes as described above). Additionally, while two system switches 250, 260 are shown, it should be understood that in other embodiments, each system 110, 120, 130, 140 may be connected to a different number of system switches, providing even more failover capacity. Of course, in other embodiments, systems may be arranged differently than the rows-of-racks configuration shown in FIGS. 1-2. For example, a system may be embodied as multiple sets of racks in which each set of racks is arranged radially, e.g., the racks are equidistant from a center switch.

Figure 3:
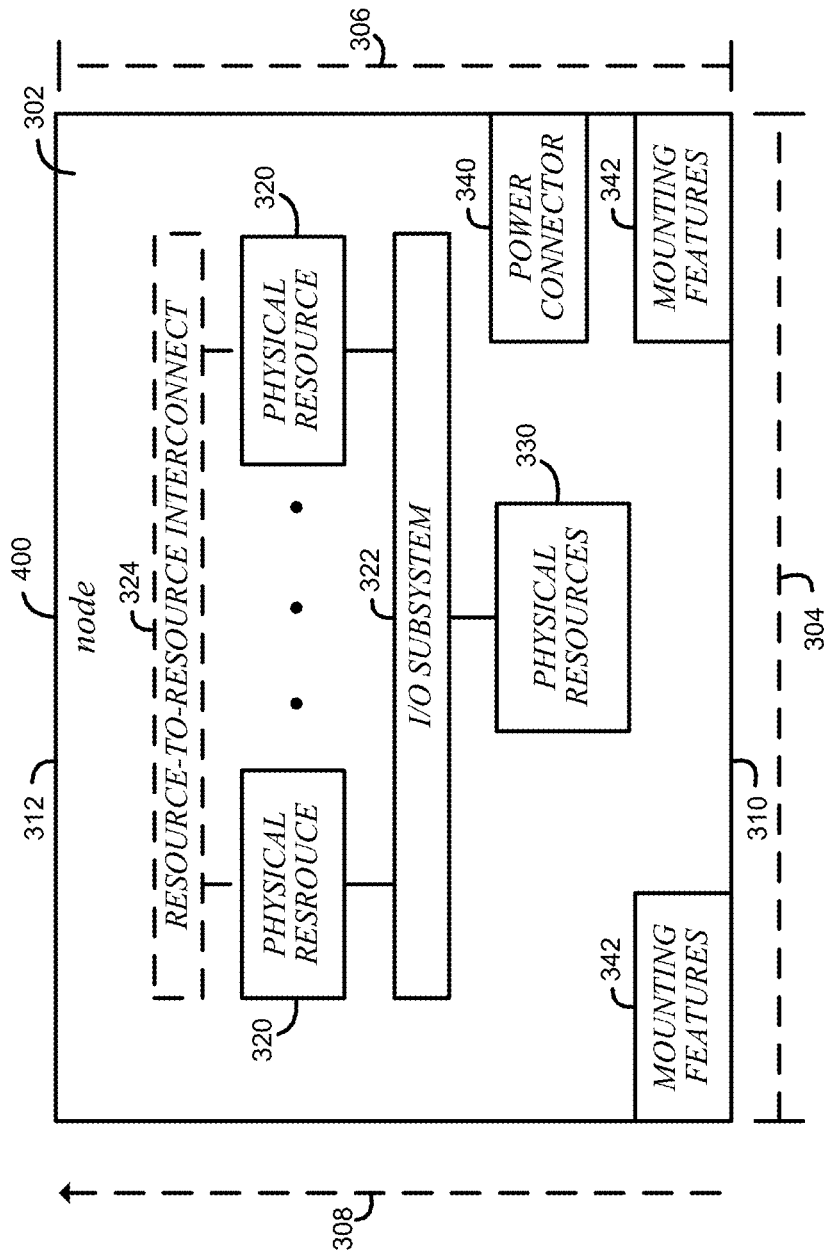
FIG. 3 is a simplified block diagram of at least one embodiment of a top side of a node.

Referring now to FIG. 3, node 400, in the illustrative embodiment, is configured to be mounted in a corresponding rack 240 of the data center 100 as discussed above. In some embodiments, each node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIGS. 7, or as a node optimized or otherwise configured to perform other specialized tasks, such as a memory node 800, discussed below in regard to FIG. 8.

Although two physical resources 320 are shown in FIG. 3, it should be appreciated that the node 400 may include one, two, or more physical resources 320 in other embodiments. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in embodiments in which the node 400 is embodied as a compute node, as accelerator co-processors or circuits in embodiments in which the node 400 is embodied as an accelerator node, storage controllers in embodiments in which the node 400 is embodied as a storage node, or a set of memory devices in embodiments in which the node 400 is embodied as a memory node.

The node 400 also includes one or more additional physical resources 330 mounted to circuit board substrate 302. In the illustrative embodiment, the additional physical resources include a network interface controller (NIC) as discussed in more detail below. Of course, depending on the type and functionality of the node 400, the physical resources 330 may include additional or other electrical components, circuits, and/or devices in other embodiments.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment for memory system, the I/O subsystem 322 is embodied as, or otherwise includes, a double data rate 4 (DDR4) data bus or a DDR5 data bus.

In some embodiments, the node 400 (FIG. 4) may also include a resource-to-resource interconnect 324. The resource-to-resource interconnect 324 may be embodied as any type of communication interconnect capable of facilitating resource-to-resource communications. In the illustrative embodiment, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), or other high-speed point-to-point interconnect utilized for resource-to-resource communications.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. In some examples, the node 400 includes local power supply (e.g., an on-board power supply) to provide power to the electrical components of the node 400. In some examples, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some embodiments, voltage regulators are placed on circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

In some embodiments, the node 400 may also include mounting features 342 configured to mate with a mounting arm, or other structure, of a robot to facilitate the placement of the node 400 in a rack 240 by the robot. The mounting features 342 may be embodied as any type of physical structures that allow the robot to grasp the node 400 without damaging the circuit board substrate 302 or the electrical components mounted thereto. For example, in some embodiments, the mounting features 342 may be embodied as non-conductive pads attached to the circuit board substrate 302. In other embodiments, the mounting features may be embodied as brackets, braces, or other similar structures attached to the circuit board substrate 302. The particular number, shape, size, and/or make-up of the mounting feature 342 may depend on the design of the robot configured to manage the node 400.

Figure 4:
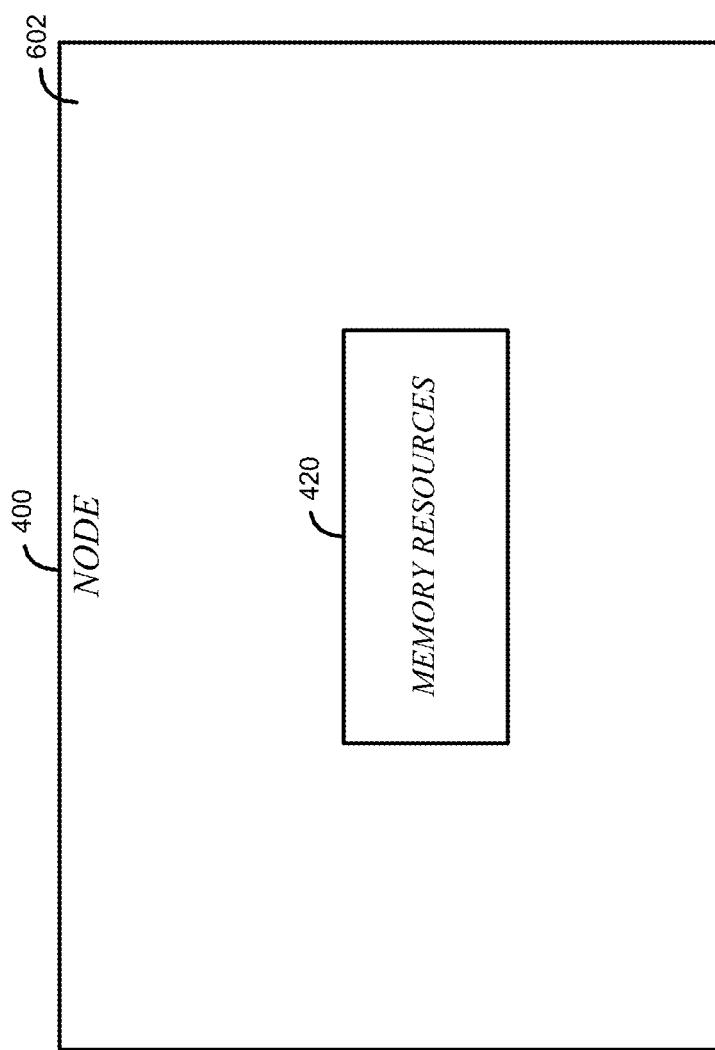
FIG. 4 is a simplified block diagram of at least one embodiment of a bottom side of a node.

Referring now to FIG. 4, in addition to the physical resources 330 mounted on circuit board substrate 302, the node 400 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some embodiments. Alternatively, in other embodiments, each physical resource 320 may be communicatively coupled to each memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 5:
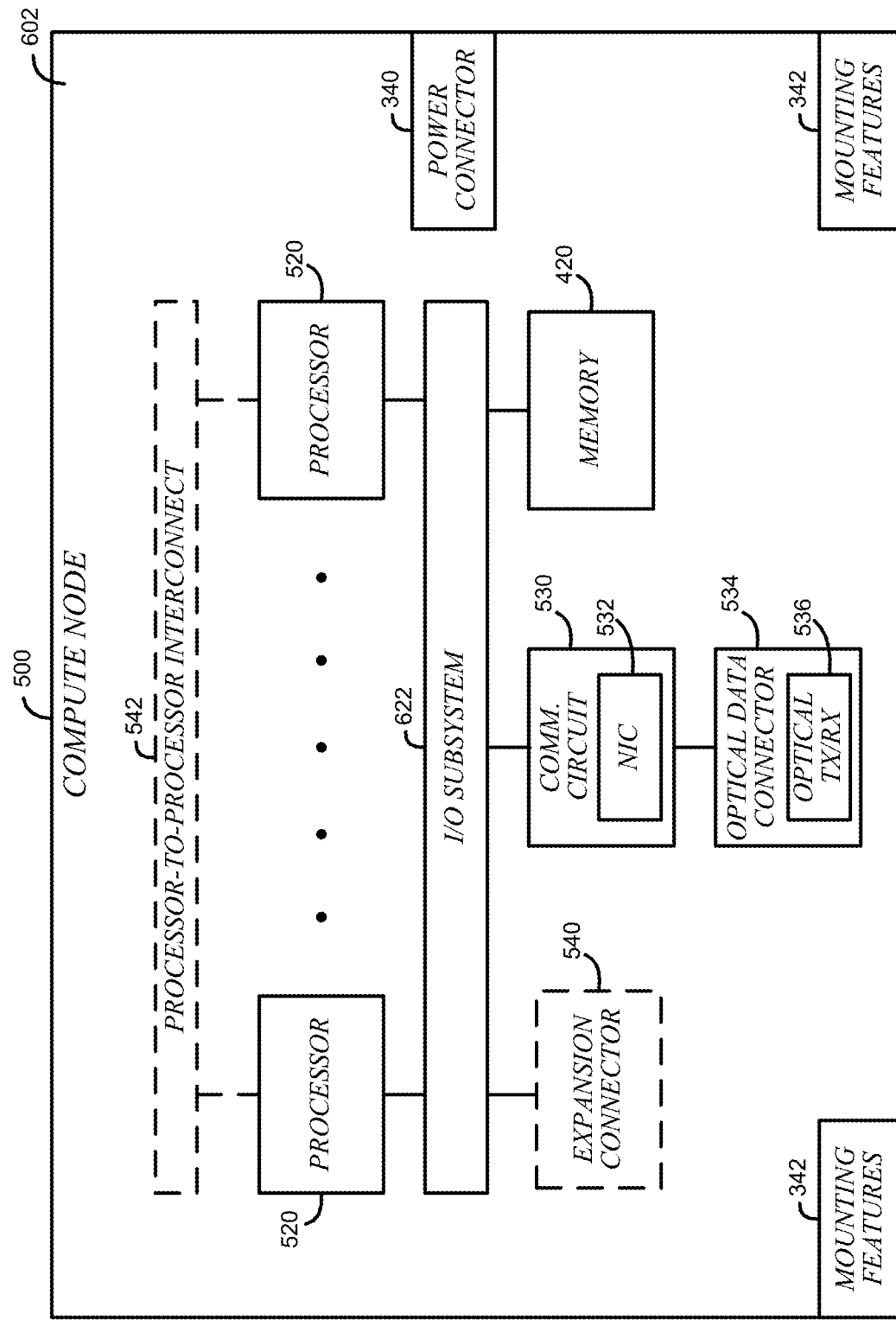
FIG. 5 is a simplified block diagram of at least one embodiment of a compute node.

Referring now to FIG. 5, in some embodiments, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520 in other embodiments. Illustratively, the processors 520 are embodied as high-performance processors 520 and may be configured to operate at a relatively high power rating.

In some embodiments, the compute node 500 may also include a processor-to-processor interconnect 542. Processor-to-processor interconnect 542 may be embodied as any type of communication interconnect capable of facilitating processor-to-processor interconnect 542 communications. In the illustrative embodiment, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an Ultra-Path Interconnect (UPI), or other high-speed point-to-point interconnect utilized for processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. In such embodiments, the local processor of the NIC 532 may be capable of performing one or more of the functions of the processors 520. Additionally or alternatively, in such embodiments, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC 532 are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

NIC 532 can be configured to select a platform to execute a function and potentially cause the function to execute on one or more other nodes to achieve time to completion.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative embodiment, the optical transceiver 536 may form a portion of the communication circuit 530 in other embodiments.

In some embodiments, the compute node 500 may also include an expansion connector 540. In such embodiments, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
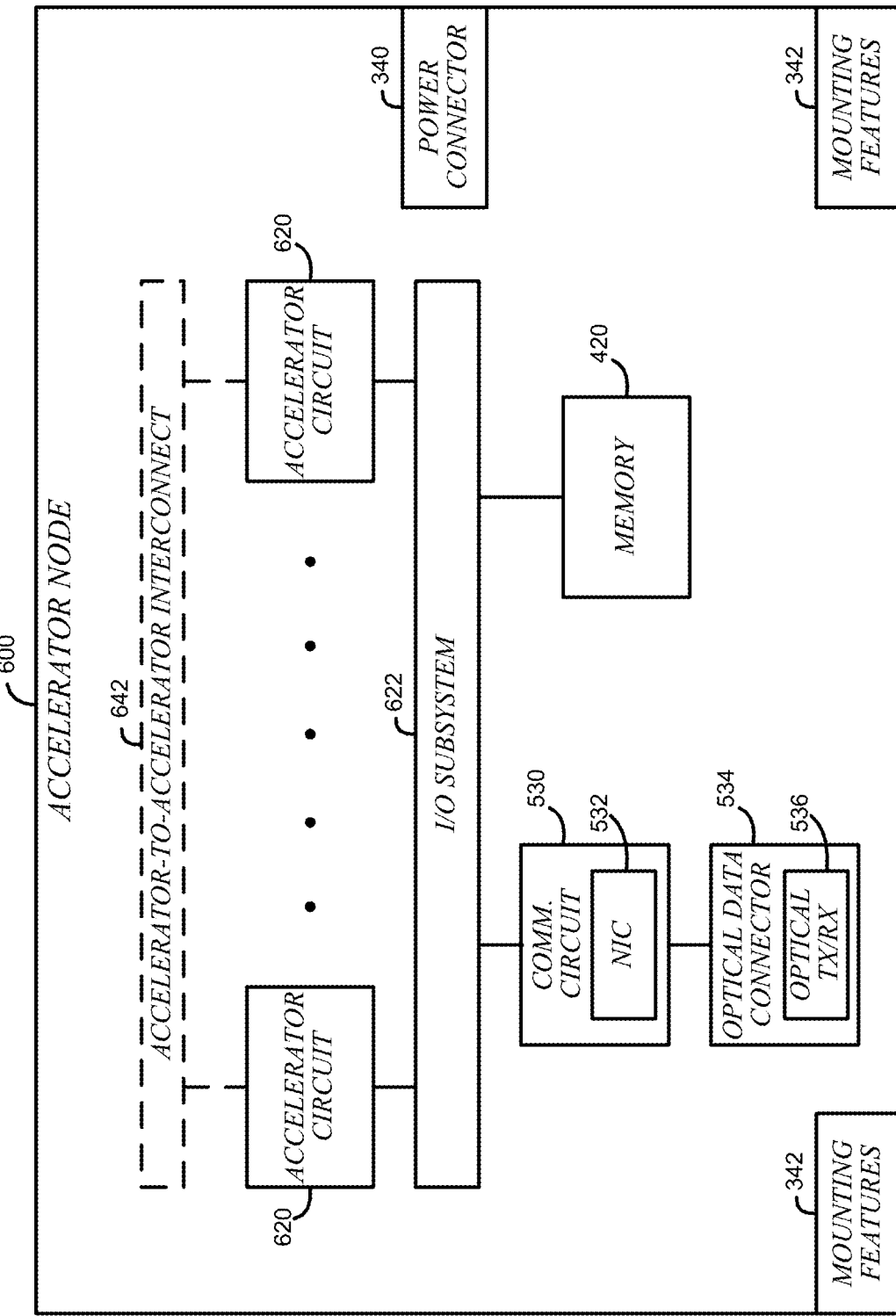
FIG. 6 is a simplified block diagram of at least one embodiment of an accelerator node usable in a data center.

Referring now to FIG. 6, in some embodiments, the node 400 may be embodied as an accelerator node 600. The accelerator node 600 is configured to perform specialized compute tasks, such as machine learning, encryption, hashing, or other computational-intensive task. In some embodiments, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other embodiments. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by P4, C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

In some embodiments, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative embodiment, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect utilized for accelerator-to-accelerator communications. In some embodiments, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
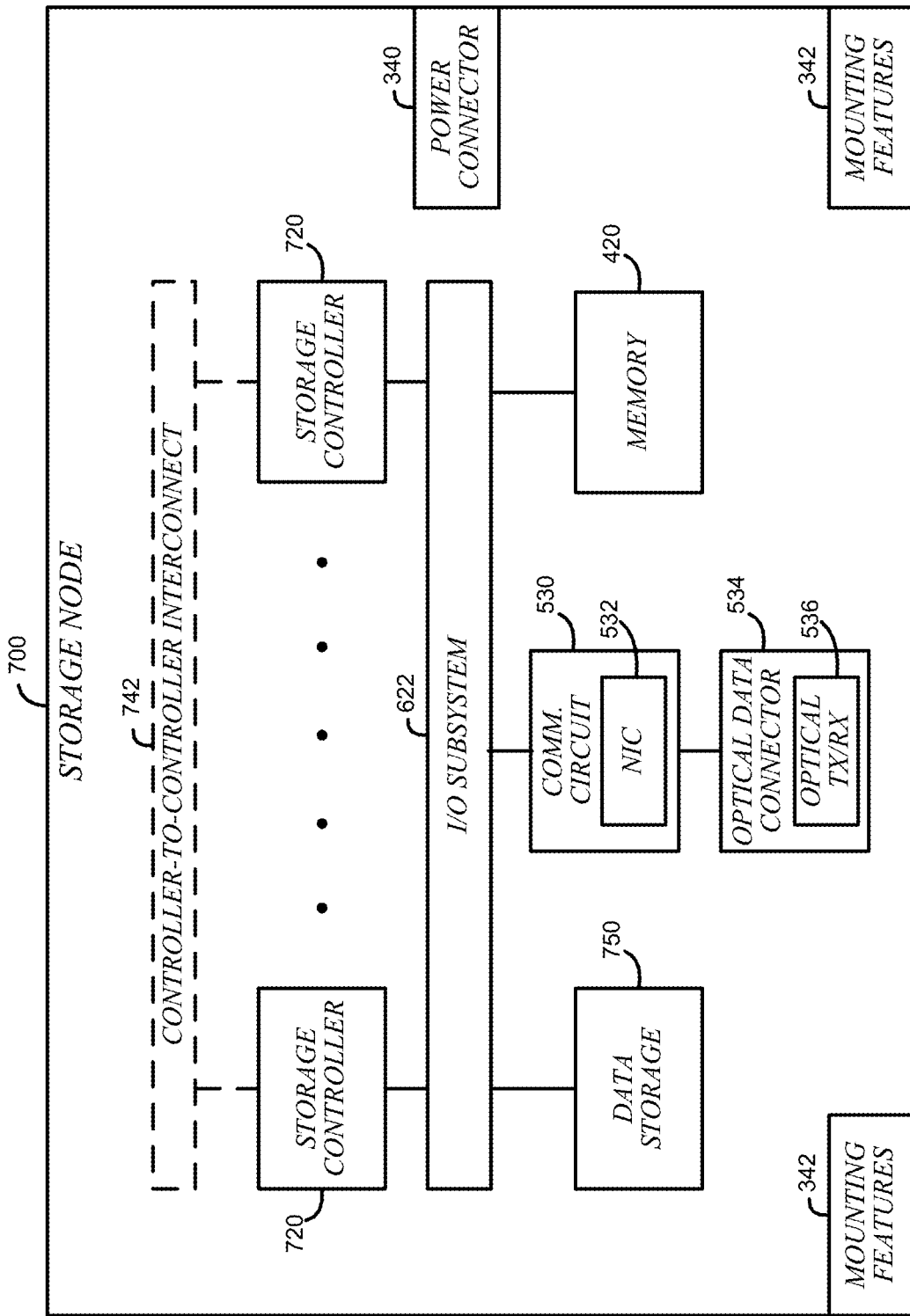
FIG. 7 is a simplified block diagram of at least one embodiment of a storage node usable in a data center.

Referring now to FIG. 7, in some embodiments, the node 400 may be embodied as a storage node 700. The storage node 700 is configured in some embodiments to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other embodiments. The storage controllers 720 may be embodied as any type of processor, controller, or control circuit capable of controlling the storage and retrieval of data into/from the data storage 750 based on requests received via the communication circuit 530 or other components. In the illustrative embodiment, the storage controllers 720 are embodied as relatively low-power processors or controllers.

In some embodiments, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative embodiment, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect utilized for controller-to-controller communications.

Figure 8:
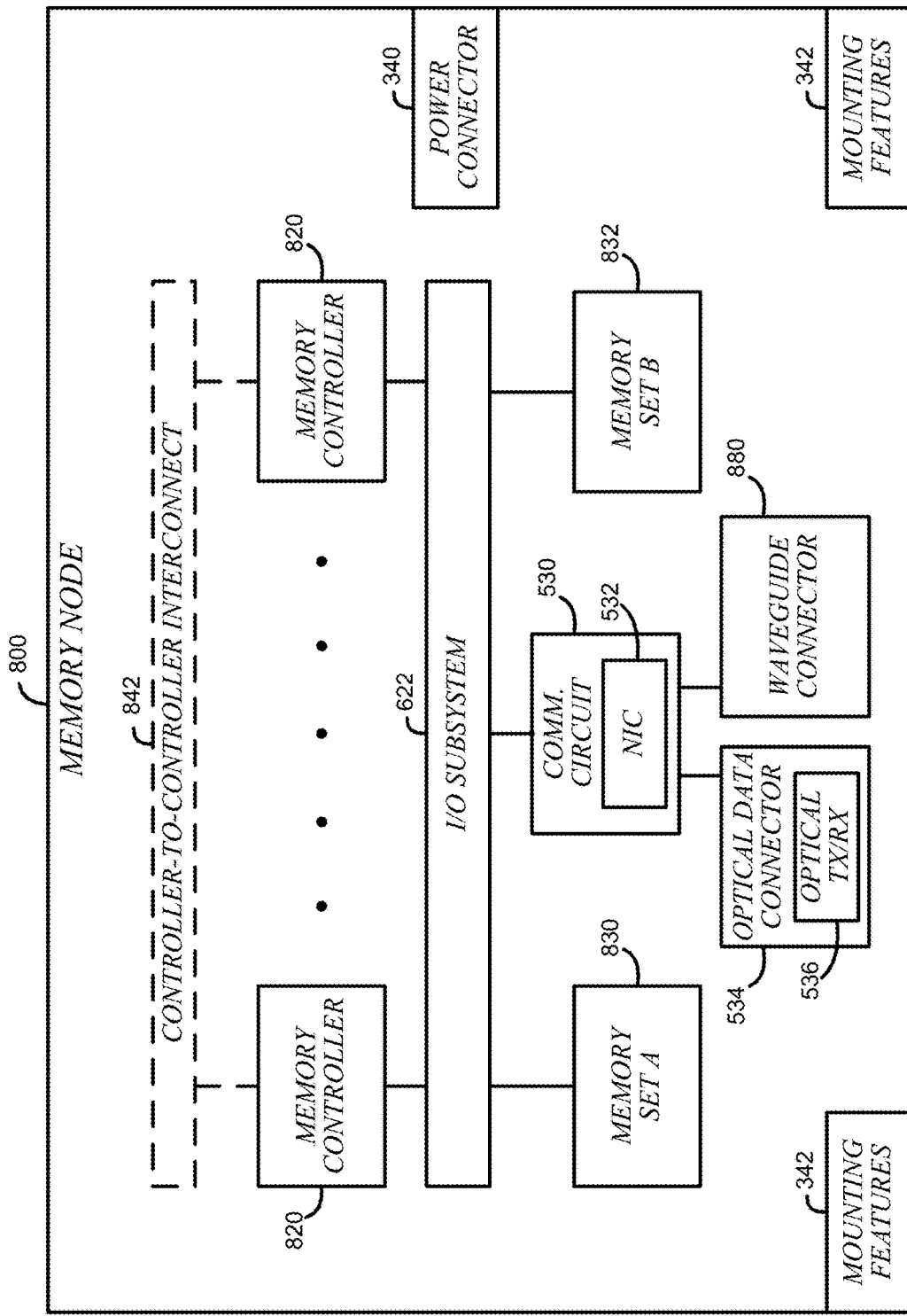
FIG. 8 is a simplified block diagram of at least one embodiment of a memory node usable in a data center.

Referring now to FIG. 8, in some embodiments, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. Also, additional external memory sets can be facilitated using communication circuit 530 and memory sets on memory node(s) located in other physical nodes (not shown). For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other embodiments. The memory controllers 820 may be embodied as any type of processor, controller, or control circuit capable of controlling the writing and reading of data into the memory sets 830, 832 based on requests received via the communication circuit 530. In the illustrative embodiment, each memory controller 820 is connected to a corresponding memory set 830, 832 to write to and read from memory devices 420 within the corresponding memory set 830, 832 and enforce a permissions (e.g., read, write, etc.) associated with node 400 that has sent a request to the memory node 800 to perform a memory access operation (e.g., read or write).

In some embodiments, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative embodiment, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect utilized for controller-to-controller communications. As such, in some embodiments, a memory controller 820 may access, through the controller-to-controller interconnect 842, memory that is within the memory set 832 associated with another memory controller 820. In some embodiments, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency and bandwidth associated with performing memory access operations as compared to accessing contiguous memory addresses from the same memory device.

Further, in some embodiments, the memory node 800 may be connected to one or more other nodes 400 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
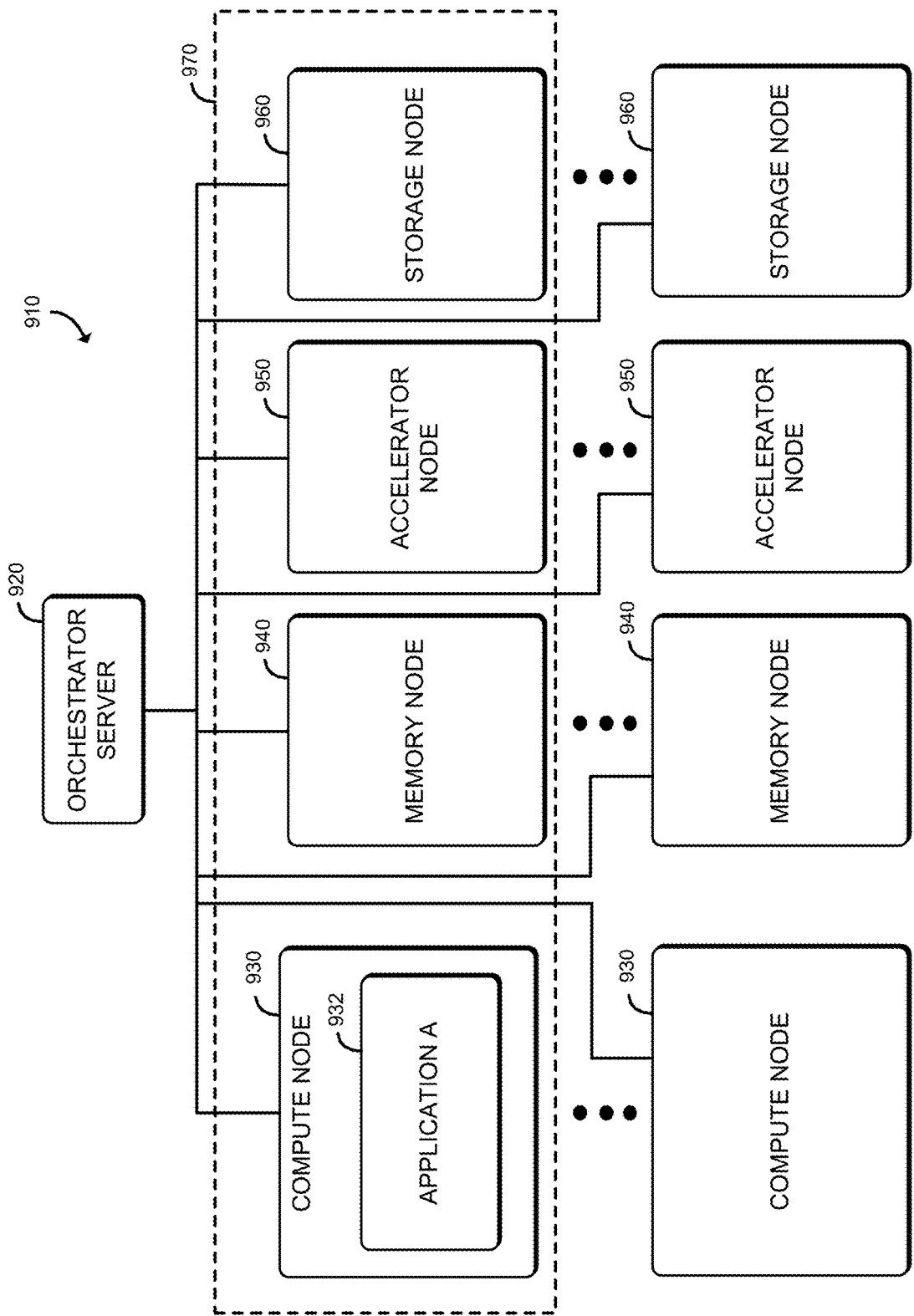
FIG. 9 depicts a system for executing one or more workloads.

Referring now to FIG. 9, a system for executing one or more workloads (e.g., applications) may be implemented. In the illustrative embodiment, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., each similar to the compute node 500), memory nodes 940 (e.g., each similar to the memory node 800), accelerator nodes 950 (e.g., each similar to the accelerator node 600), and storage nodes 960 (e.g., each similar to the storage node 700). One or more of the nodes 930, 940, 950, 960 may be grouped into a managed node 970, such as by the orchestrator server 920, to collectively perform a workload (e.g., an application 932 executed in a virtual machine or in a container). While orchestrator node 920 is shown as a single entity, alternatively or additionally, its functionality can be distributed across multiple instances and physical locations.

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node, and may exist regardless of whether a workload is presently assigned to the managed node. In the illustrative embodiment, the orchestrator server 920 may selectively allocate and/or deallocate physical resources 320 from the nodes 400 and/or add or remove one or more nodes 400 from the managed node 970 as a function of quality of service (QoS) targets (e.g., a target throughput, a target latency, a target number instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in each node 400 of the managed node 970 and compare the telemetry data to the quality of service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some embodiments, the orchestrator server 920 may identify trends in the resource utilization of the workload (e.g., the application 932), such as by identifying phases of execution (e.g., time periods in which different operations, each having different resource utilizations characteristics, are performed) of the workload (e.g., the application 932) and pre-emptively identifying available resources in the data center and allocating them to the managed node 970 (e.g., within a predefined time period of the associated phase beginning). In some embodiments, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance, including optionally previously collected historical performance, of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with each potential resource available in the data center 100 (e.g., the latency associated with the performance of the resource itself in addition to the latency associated with the path through the network between the compute node executing the workload and the node 400 on which the resource is located).

In some embodiments, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some embodiments, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 920 may identify patterns in resource utilization phases of the workloads and use the patterns to predict future resource utilization of the workloads.

To reduce the computational load on the orchestrator server 920 and the data transfer load on the network, in some embodiments, the orchestrator server 920 may send self-test information to the nodes 400 to enable each node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Each node 400 may then report back a simplified result (e.g., yes or no) to the orchestrator server 920, which the orchestrator server 920 may utilize in determining the allocation of resources to managed nodes.

Embodiments described herein can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Edge Network

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local service level agreements (SLAs) or service level objectives (SLOs), manage tiered service requirements, and enable local features and functions on a temporary or permanent basis.

A pool can include a device on a same chassis or different physically dispersed devices on different chassis or different racks. A resource pool can include homogeneous processors, homogeneous processors, and/or a memory pool. Pooling of heterogeneous resources can be implemented using multiple homogeneous resource pools.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

Figure 10:
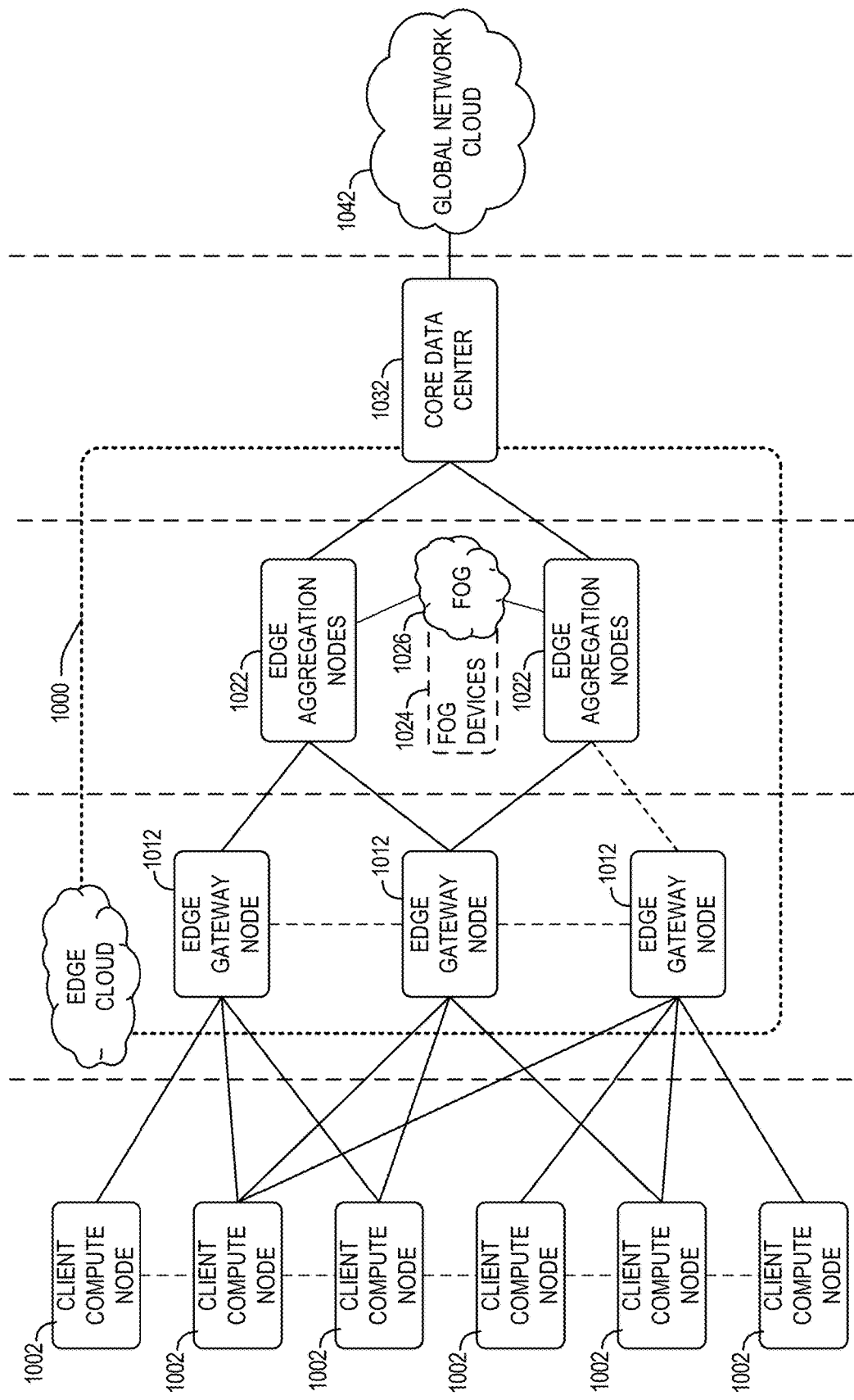
FIG. 10 depicts an example system.

FIG. 10 generically depicts an edge computing system 1000 for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. The implementation of the edge computing system 1000 may be provided at or on behalf of a telecommunication service provider ("telco", or "TSP"), internet-of-things service provider, cloud service provider (CSP), enterprise entity, or any other number of entities. Various implementations and configurations of the system 1000 may be provided dynamically, such as when orchestrated to meet service objectives.

For example, the client compute nodes 1002 are located at an endpoint layer, while the edge gateway nodes 1012 are located at an edge devices layer (local level) of the edge computing system 1000. Additionally, the edge aggregation nodes 1022 (and/or fog devices 1024, if arranged or operated with or among a fog networking configuration 1026) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/ workflow level services, in terms of the overall transaction, by pushing certain workloads to the edge or to the cloud based on the ability to fulfill the overall service level agreement. Fog computing in many scenarios provide a decentralized architecture and serves as an extension to cloud computing by collaborating with one or more edge node devices, providing the subsequent amount of localized control, configuration and management, and much more for end devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1032 is located at a core network layer (a regional or geographically-central level), while the global network cloud 1042 is located at a cloud data center layer (a national or world-wide layer). The use of "core" is provided as a term for a centralized network location— deeper in the network—which is accessible by multiple edge nodes or components; however, a "core" does not necessarily designate the "center" or the deepest location of the network. Accordingly, the core data center 1032 may be located within, at, or near the edge cloud 1000. Although an illustrative number of client compute nodes 1002, edge gateway nodes 1012, edge aggregation nodes 1022, edge core data centers 1032, global network clouds 1042 are shown in FIG. 10, it should be appreciated that the edge computing system 1000 may include additional devices or systems at each layer. Devices at a layer can be configured as peer nodes to each other and, accordingly, act in a collaborative manner to meet service objectives.

Consistent with the examples provided herein, a client compute node 1002 may be embodied as any type of endpoint component, device, appliance, or other thing capable of communicating as a producer or consumer of data. Further, the label "node" or "device" as used in the edge computing system 1000 does not necessarily mean that such node or device operates in a client or agent/minion/follower role; rather, one or more of the nodes or devices in the edge computing system 1000 refer to individual entities, nodes, or subsystems which include discrete or connected hardware or software configurations to facilitate or use the edge cloud 1000.

As such, the edge cloud 1000 is formed from network components and functional features operated by and within the edge gateway nodes 1012 and the edge aggregation nodes 1022. The edge cloud 1000 may be embodied as any type of deployment that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge cloud 1000 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1000 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud 1000 between the core data center 1032 and the client endpoints (e.g., client compute nodes 1002). Some of these are discussed in the following sections in the context of network functions or service virtualization, including the use of virtual edges and virtual services which are orchestrated for multiple stakeholders.

As discussed in more detail below, the edge gateway nodes 1012 and the edge aggregation nodes 1022 cooperate to provide various edge services and security to the client compute nodes 1002. Furthermore, because a client compute node 1002 may be stationary or mobile, a respective edge gateway node 1012 may cooperate with other edge gateway devices to propagate presently provided edge services, relevant service data, and security as the corresponding client compute node 1002 moves about a region. To do so, the edge gateway nodes 1012 and/or edge aggregation nodes 1022 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 1000. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if one or more of A, B or C stakeholders restricts access then access is restricted). Within the edge cloud 1000, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

Figure 11:
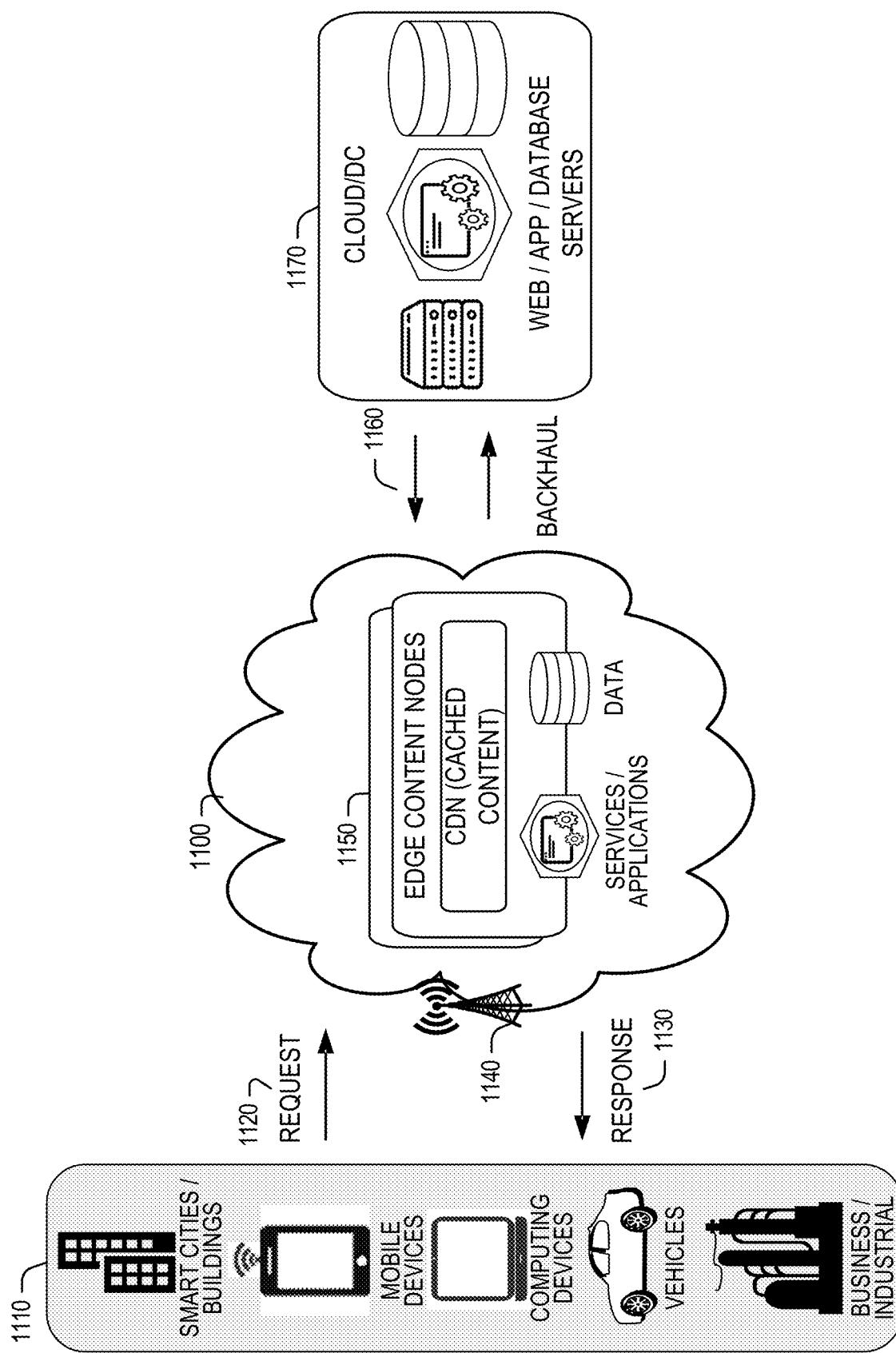
FIG. 11 shows an example system.

FIG. 11 shows an example where various client endpoints 1110 (in the form of mobile devices, computers, autonomous vehicles, business computing equipment, industrial processing equipment) provide requests 1120 for services or data transactions, and receive responses 1130 for the services or data transactions, to and from the edge cloud 1100 (e.g., via a wireless or wired network 1140). Within the edge cloud 1000, the CSP may deploy various compute and storage resources, such as edge content nodes 1150 to provide cached content from a distributed content delivery network. Other available compute and storage resources available on the edge content nodes 1150 may be used to execute other services and fulfill other workloads. The edge content nodes 1150 and other systems of the edge cloud 1000 are connected to a cloud or data center 1170, which uses a backhaul network 1160 to fulfill higher-latency requests from a cloud/ data center for websites, applications, database servers, etc.

Various examples described herein can be used in one or more examples of FIGS. 1-11 where a network interface device is to select a platform to execute a function and potentially cause the function to execute on one or more other nodes to achieve time to completion. One or more hardware resources in the systems of FIGS. 1-11 can be used to execute one or more instances of the function.

Failover System

Figure 12:
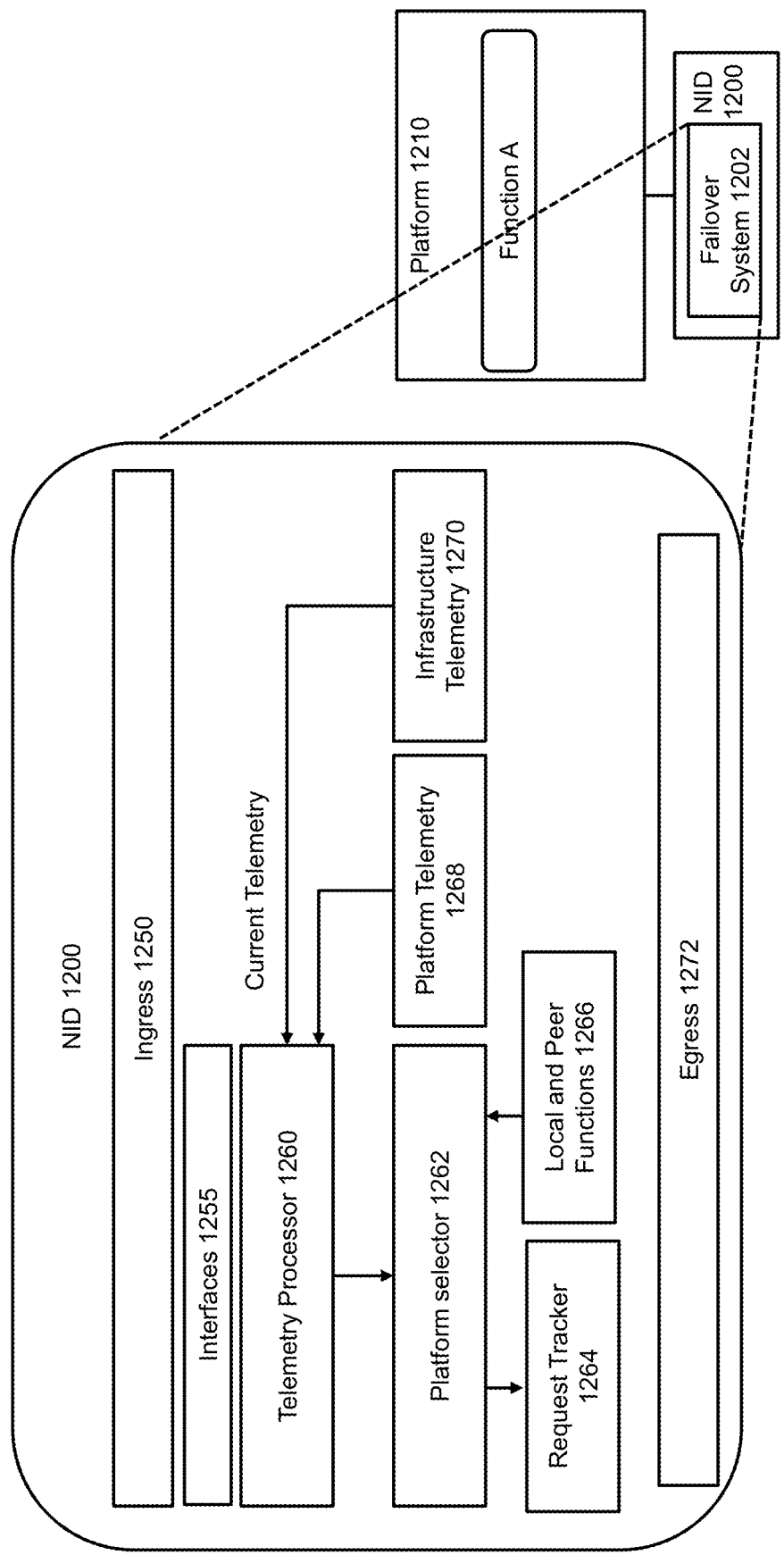
FIG. 12 depicts an example system.

FIG. 12 depicts an example system in which a network interface device can include a configurable failover system. Network interface device 1200 can include a failover system 1202 that can be configured using interfaces 1255 to monitor progress to completion of a function and, based on at least whether the function is not expected to complete within a specified time-to-completion for the function, cause the function to execute on another processor or system within a same node accessible through a bus, device interface (e.g., PCIe or CXL), or interconnect, or on a different node accessible through a network (e.g., Ethernet consistent). For example, failover system 1202 can perform operations of a work performance manager to attempt to ensure completion of a function in accordance with parameters of an applicable service level agreement (SLA).

For example, failover system 1202 can be programmed as to whether to cause failover and under what conditions through interfaces 1255 via a configuration file, application program interface (API), command line interface (CLI), or another source. In some examples, configuration of failover system 1202 can be limited to a datacenter owner, cloud service provider (CSP), telecommunications provider, or on-premises data center administrator with credentials to configure failover system 1202 via passwords, or encryption keys.

Interfaces 1255 can receive identifications of functions executing on a connected platform 1210 (e.g., processors, memory, cache, accelerators, and so forth). When a new function is registered as executing on the connected platform, network interface device 1200 can advertise execution of the function to peer network interface devices and platforms. Identification of execution of a function can include one or more of: Function ID; internet protocol (IP) address of the peer node; or meta-data (e.g., performance expected for that function). For example, an advertisement of execution of the function to peer network interface devices and platforms can include one or more of: function identifier (ID); device or devices providing implementation of the function; expected time to completion, time of execution, or latency; or resources that perform the function. A device or devices providing implementation of the function can include one or more of: amount of memory or type of memory (e.g., volatile or non-volatile), storage capacity, availability of accelerators that application is to utilize, CPU instructions that application uses (e.g., crypto, artificial intelligence (AI), UMWAIT, and so forth), and so forth.

Interfaces 1255 can receive a configuration of which network interface device(s) and/or platform(s) from which to receive telemetry and/or resource utilization information. Interfaces 1255 can receive reported telemetry and/or resource utilization information from peer network interface devices concerning a current load or resource utilization of platform 1210 connected to network interface device 1200. Current load or resource utilization of platform can include resource ID (e.g., processor load or utilization, accelerator load or utilization, available memory, available cache, and so forth) and corresponding level of resource usage (e.g., percentage of utilization or amount of available memory or cache).

Interfaces 1255 can receive utilization information of one or more other platforms as well as expected performance of one or more functions on other platforms. For example, expected performance can include one or more of: (1) average latency of the function (e.g., time to completion); (2) percentage of times that a function has been failed over or forwarded for execution on another node. For example, information of (1) and (2) can be conveyed as metric ID (e.g., average latency, percentages of failover or forwarding) and a value of the metric ID.

For example, Link Layer Discovery Protocol (LLDP) of IEEE 802.3 can be used to transmit or receive information via interfaces 1255 such as one or more of: advertising execution of the function A on platform 1210 to other peer network interface devices and platforms, as well as current load or resource utilization of one or more platforms, and/or expected performance of one or more functions on other platforms.

Various authentication schemes can be used to verify that a failover rule is to apply to a particular function. For example, a function and failover rule applied by failover system 1202 can be authenticated by matching tenant ID, requester ID, media access control (MAC) address, source IP address for the packets that convey the function performance request and the failover rule. A failover rule can indicate how to weigh particular telemetry data in determining which platform to select to execute a function and whether to cause the function to be executed on another platform. For example, a particular failover rule may indicate the function is to be executed on one or multiple nodes to attempt to guarantee completion within a time-to-completion. For example, a failover rule can indicate to prefer execution on a local node unless another node or nodes have utilization and predicted completion times that are X % better than a local node. In some cases, particular failover rules can be applied to particular functions whereas general failover rules can be applied to functions without specific applicable failover rules.

Platform telemetry 1268 can store telemetry from platform 1210 to specify a current status of the various elements that perform the functions (e.g., processor utilization, accelerator utilization, free memory space, or free cache space). Platform telemetry data may be accessible to devices and platforms using out-of-band channels. Telemetry may be determined by the actual resources that perform the functions. Infrastructure telemetry 1270 can store telemetry from one or more other platforms such as utilization information of one or more other platforms as well as expected performance of one or more functions on other platforms.

Telemetry processor 1260 can process telemetry of the platform stored in platform telemetry 1268 and telemetry of peer platforms stored in infrastructure telemetry 1270.

Telemetry processor 1260 can generate statistical measures such as reliability of a connected platform and one or more other platforms over a period of time. Statistical measures can be stored in a table in local and peer functions 1266 accessible to platform selector 1262. An example format of the table can be as follows.

TABLE 1

| FUNCTION ID | LIST OF PEERS | META-DATA |
|---|---|---|
| ID | {List} | {List of reputation} |
| 0x1312 | {IP1, . . . , IPn]} | {80%, 10% . . . } |
| . . . | . . . | . . . |

The table, shown as local and peer functions 1266, can be indexed by the function identifier (ID) and provide a list of peer nodes, by IP address, or other identifier, that execute the function or are capable of executing the function. A function can be identified using a function identifier. For a peer node, the table can indicate one or more of: utilization of hardware resources by the function, current load of the platform, or reputation or expectation percentage that the function can be executed within a time-to-completion on that node.

Platform selector 1262 can process requests to perform a function by intercepting the requests in one or more packets. For example, one or more packets can convey a binary executable that, when executed by a processor, performs the function, as well as a function identifier and associated data to be processed. In some examples, the one or more packets can convey a function identifier and associated data to be processed and a node can load a binary to execute the function by loading the binary that corresponds to the function identifier from memory.

Request tracker 1264 can identify functions requested to be performed by platform 1210 and track where a function performance conveyed in one or more packets is performed. If multiple packets convey a function performance request, packets can be stored in request tracker 1264 and the function execution location determined after the packet is received. If a determination was made that the request will be processed at another node, a packet associated with the request can be forwarded to the node that is to perform the function.

An example format of request tracker 1264 can be as shown in Table 2 below.

TABLE 2

| Request ID | Payload | Arrival Timestamp | Status |
|---|---|---|---|
| ID 0x34 | DATA DATA | Time 134543232 | STATUS SUBMITTED |
| ... | ... | ... | |

Platform selector 1262 can determine whether to forward the request to another node based on telemetry and historical data related to local platform utilization and remote platform performance of the same or similar function. For example, platform selector 1262 can determine which node not to execute a function based on platform 1210 or another platform being non-responsive based on information transmitted in or out-of-band mechanism from a baseboard management controller (BMC), or other device. For example, platform selector 1262 can determine a node utilization is too high or the resources used by the functions are overloaded and not select that node for execution of the function. For example, platform selector 1262 can select a node to execute a function based on a history of the node completing execution of the function within a time-to-completion.

A function, operating system, driver, or other software can write progress of the function into a specific memory region for the specific request with Function ID. Platform selector 1262 can read the forward progress to determine whether to cause the function to be performed by another node.

In some examples where a function has been issued to a local platform but platform selector 1262 determines to cause the function to be executed on another platform, platform selector 1262 can consider elapsed time from dispatch of the function on the local platform in determining a next platform to execute the function within a time-to-complete the function. For example, if a time-to-completion of a function is x+y, x milliseconds have elapsed since dispatch of the function at the local platform for execution and a [transit time to another node+expected time to completion of the function at the another node] is less than y, then platform selector 1262 can determine to send the function to execute on the another node.

Platform selector 1262 can determine that while function is executing on platform 1210, the function may not complete performance in a particular time-to-completion and can determine to execute the function on another node. For example, a processor platform 1210 can take too much time to respond to inquiries from failover system 1202 or it identifies that the processor may be inoperative (e.g., a transient failure) and can send or forward a request to perform the function to another node. The function executing on platform 1210 can continue and remain in a local function tracking queue (e.g., request tracker 1264), but can be marked as forwarded. Platform selector 1262 can keep the request in the cache for a configured amount of time and remove the entry for the function to interrupt operation of the function or prevent execution of the function. Where the function is performed on another platform, platform selector 1262 can intercept a response from platform 1210 for a particular request to perform the function and can drop the response because the function is performed on another node, generate an acknowledgement (ACK) to the platform to send a fake ACK response from the target of the request response, and update requester tracker 1264 to identify that the function is performed solely at another node. After completion of the function, data can be made available to a requester of the function.

In some examples, where platform selector 1262 determines to cause the function to execute on another node, platform selector 1262 can cause the local platform processor to stop executing the function to free processor resources for other uses.

Figure 13:
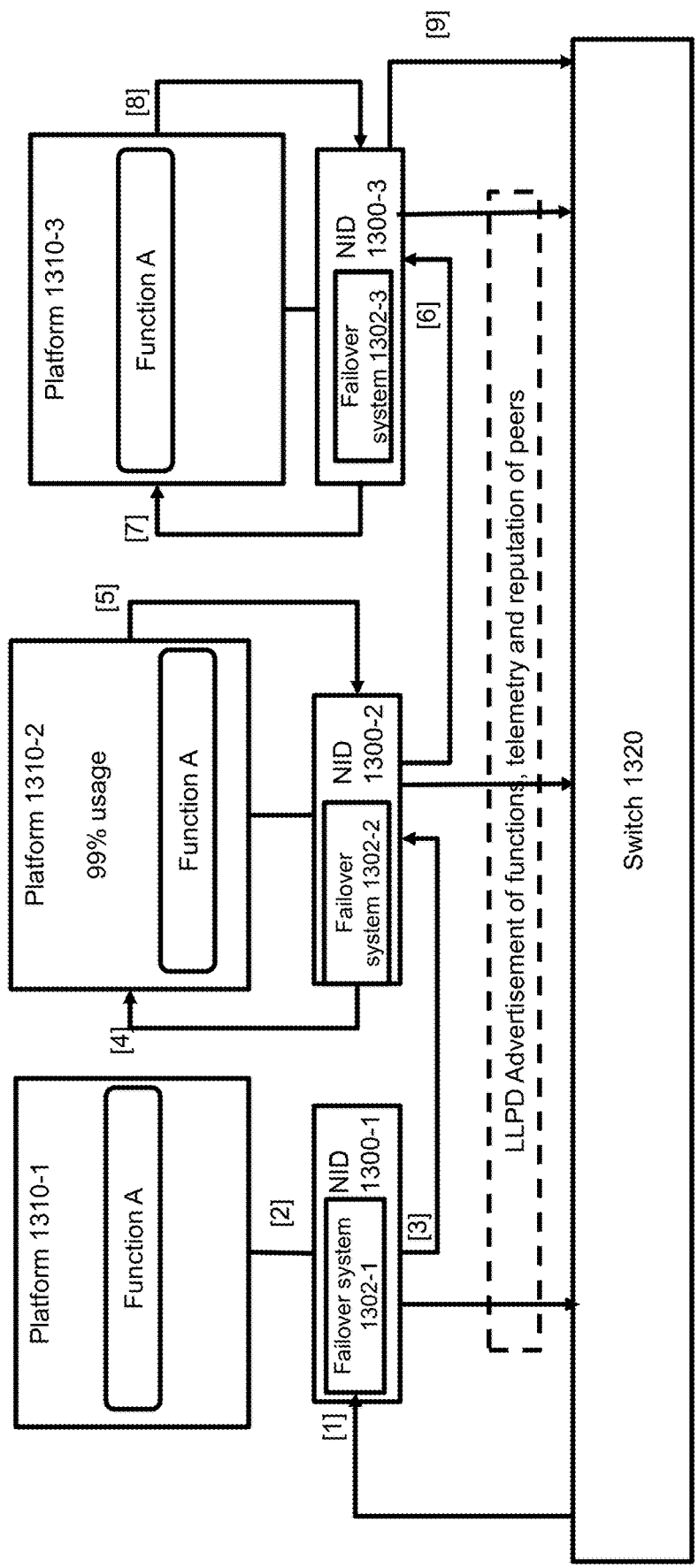
FIG. 13 depicts an example system.

FIG. 13 provides an example operation. Network interface devices (NIDs) 1300-1 to 1300-3 can include circuitry or processors to intercept and manage performance of specific functions on a local platforms (e.g., 1310-1 to 1310-3) or other nodes to provide failover. In this example, NIDS 1300-1 to 1300-3 receive SLAs for one or more functions. Failover systems 1302-1 to 1302-3 can detect progress of execution of the function to completion and forward the request to perform the function to another node if a time-to-completion at the node is not expected to be met, as described herein. Failover systems 1302-1 to 1302-3 can receive telemetry from other node(s) and decides to forward request to node that is expected to complete the request in a time-to-completion associated with the function.

At (1), NID 1300-1 for platform 1310-1 can intercept a request to perform a function. At (2), NID 1300-1 can check status of platform 1310-1 and determine whether to forward the request to another node because: (a) platform 1310-1 is not responsive or (b) platform 1310-1 utilization is too high. In the example, NID 1300-1 identifies that platform 1310-1 is not accessible (e.g., transient failure and/or being rebooted) and, at (3), forwards the request to NID 1300-2.

At (4), NID 1300-2 elects to allow the request to be performed at platform 1310-2. However, at (5), the CPU of platform 1310-2 is either taking too much time to respond to NID 1300-2 or NID 1300-2 identifies that the CPU may be not functioning (e.g., transient failure) or utilized at full capacity (e.g., 99%). At (6), NID 1300-2 forwards the function performance request to yet another node.

At (7), NID 1300-3 determines to allow platform 1310-3 to perform the function based on data that indicate platform 1310-3 is likely to complete the function within the time-to-completion. The CPU of platform 1310-3 processes the request and provides the response. At (8), CPU of platform 1310-3 responds with the response of the original request. At (9), NID 1300-2 identifies that this response was forwarded and drops the response from platform 1310-2 and, optionally, generates an ACK to the CPU of platform 1310-2. Note that platform 1310-2 may not wait for or expect an ACK. In some examples, the request can include an indicator that specifies whether an ACK is to be generated regardless of whether a result is to be dropped.

Various network interface devices 1300-1 to 1300-3 and switch 1320 can coordinate operations in order for switch 1320 to store and send to network interface devices 1300-1 to 1300-3 one or more of: (1) advertisement what functions are available to execute; (2) identify what has been the moving average utilization of the system; (3) identify average latencies for specific functions; (4) identify expected performance of CPUs or devices connected to the network interface devices such as how often devices fail or respond late.

In some examples, multiple NIDs receive or intercept a function execution request that is sent by multicast and NIDs can coordinate and negotiate among themselves as to which chosen platform will start performing the function. Should a NID detect that time-to-completion will not be met by the chosen platform, a NID for the chosen platform can choose to cause the function to execute on one or more other platforms as described herein to increase a probability that the function will be finished in-time. The negotiation between NIDs can give the forwarding NID a hint on other NIDs/platforms to forward the request.

Figure 14:
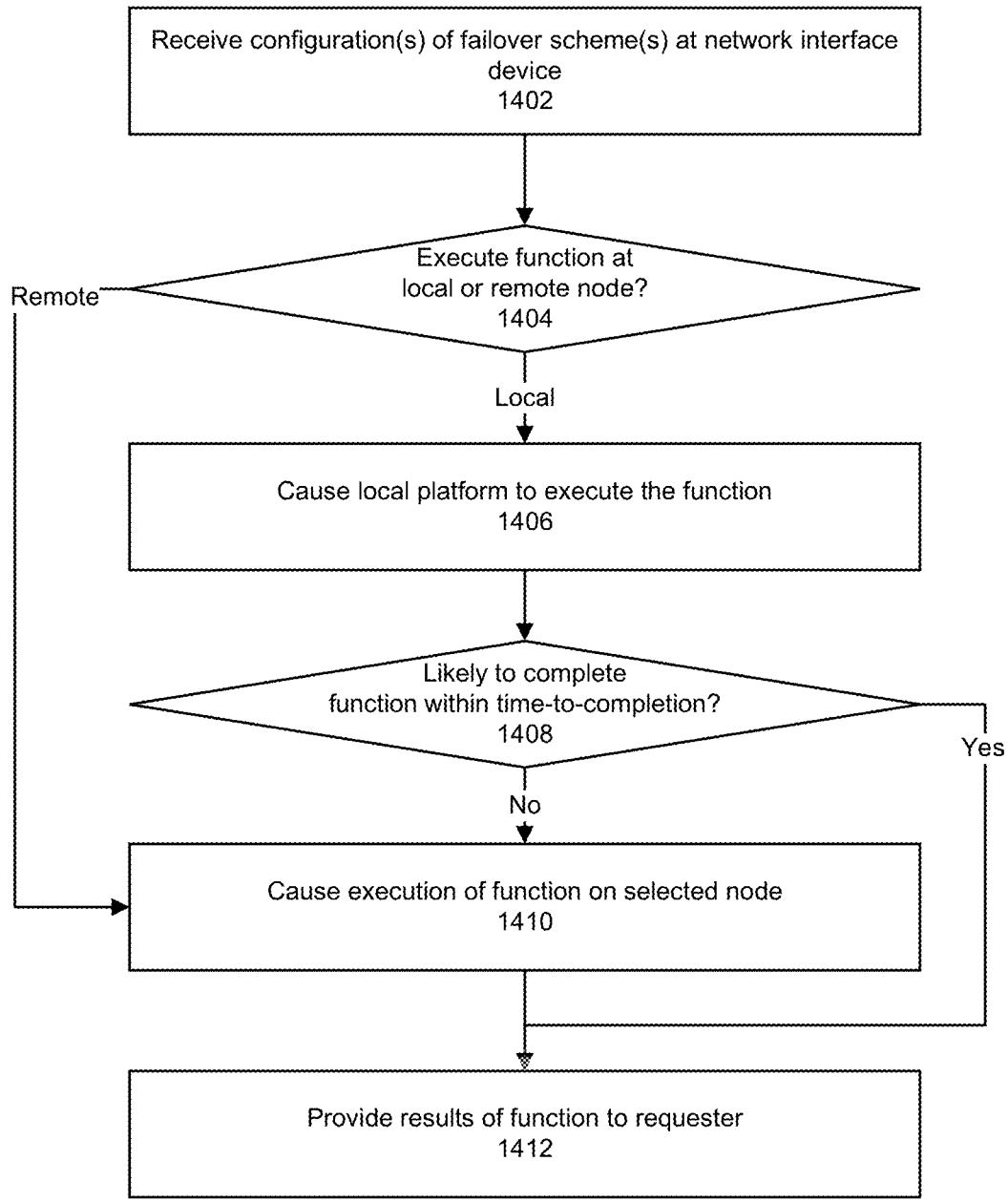
FIG. 14 depicts an example process.

FIG. 14 depicts an example process. At 1402, a network interface device can be configured with one or more failover polices to apply to functions executing on a local platform. A local platform can be connected to the network interface device using a device interface or bus. Various examples of failover policies are described herein. A failover policy can identify whether the network interface device is to select the local platform or a network or fabric connected remote platform or platforms to perform a function based on platform utilization data and historic function execution times.

At 1404, based on receipt of a request to perform a function, the network interface device can determine whether to cause the function to be executed on the local platform and/or remote platform(s) based on an applicable failover policy. If the network interface device determines that the local platform can complete execution of the function within a time-to-completion, at 1406, the network interface device can cause the local platform to execute the function. If the network interface device determines that one or more remote platforms can complete execution of the function within a time-to-completion, at 1410, the network interface device can cause one or more remote platforms to execute the function. In some examples, the network interface device can cause the local platform and one or more remote platforms to execute the function. In some examples, function execution can occur on local and one or more remote nodes to provide parallel execution to increase a probability that a result of execution of the function will be received within a required time frame.

At 1408, the network interface device can determine whether the function execution at the local platform is likely to complete execution within an associated time-to-completion. Based on measured performance data indicating the time-to-completion for the function is not likely to be met, at 1410, the network interface device can cause the function to be executed on one or more nodes that are determined to be likely to finish the function within the time-to-completion.

At 1412, the network interface device can receive a response to completion of the function to a requester of execution of the function. In some examples, a first result received from execution of the function at the local platform and/or one or more remote nodes can be provided to a requester of execution of the function.

Figure 15:
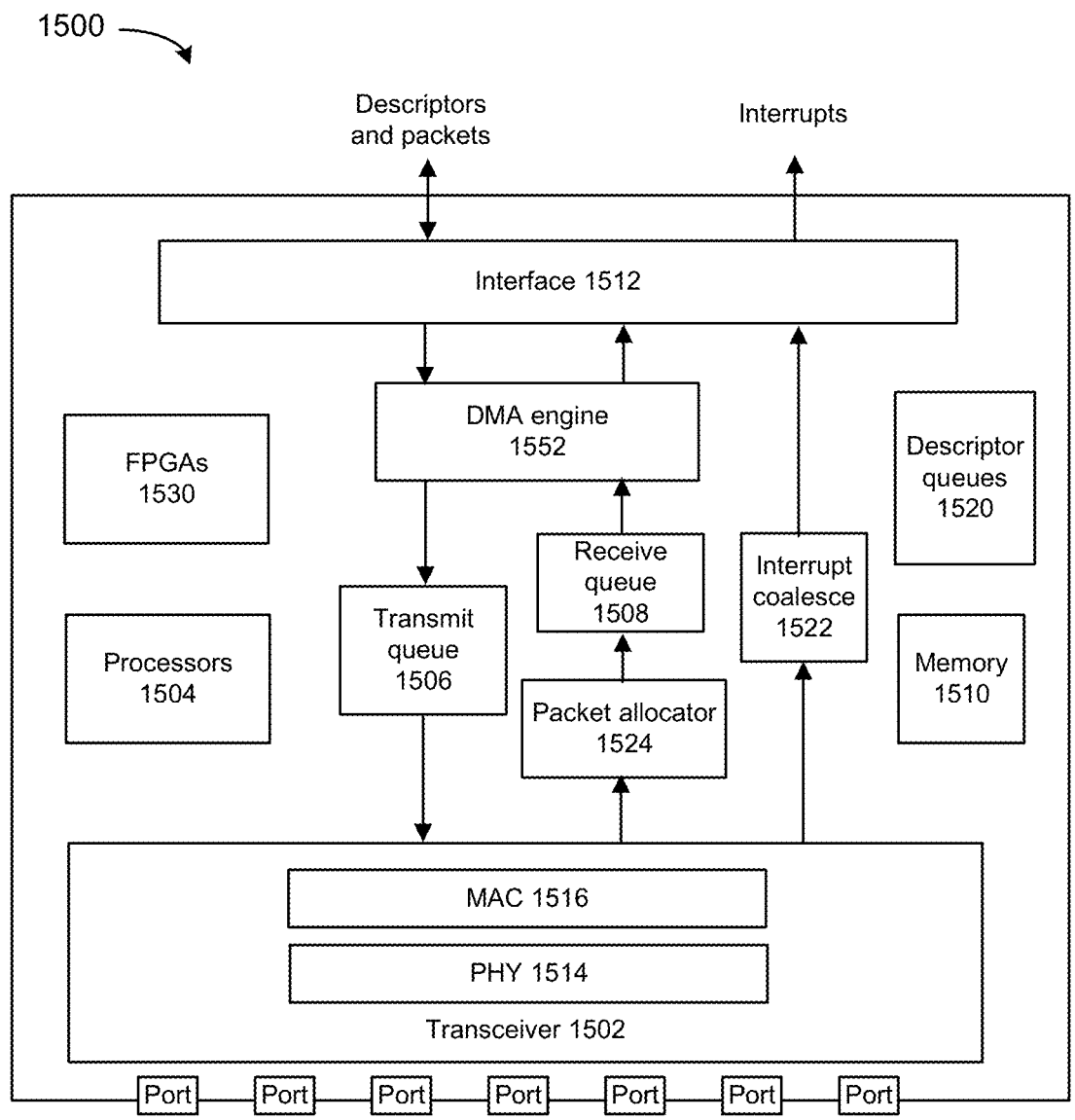
FIG. 15 depicts an example network interface.

FIG. 15 depicts a network interface that can use embodiments or be used by embodiments. Various processor resources and the network interface can select a platform to execute a function and potentially cause the function to execute on one or more other nodes to achieve time to completion as described herein. In some examples, network interface 1500 can be implemented as a network interface controller, network interface card, a host fabric interface (HFI), or host bus adapter (HBA), and such examples can be interchangeable. Network interface 1500 can be coupled to one or more servers using a bus, PCIe, CXL, or DDR. Network interface 1500 may be embodied as part of a system-on-a-chip (SoC) that includes one or more processors, or included on a multichip package that also contains one or more processors.

Some examples of network device 1500 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1500 can include transceiver 1502, processors 1504, transmit queue 1506, receive queue 1508, memory 1510, and bus interface 1512, and DMA engine 1552. Transceiver 1502 can be capable of receiving and transmitting packets in conformance with the applicable protocols such as Ethernet as described in IEEE 802.3, although other protocols may be used. Transceiver 1502 can receive and transmit packets from and to a network via a network medium (not depicted). Transceiver 1502 can include PHY circuitry 1514 and media access control (MAC) circuitry 1516. PHY circuitry 1514 can include encoding and decoding circuitry (not shown) to encode and decode data packets according to applicable physical layer specifications or standards. MAC circuitry 1516 can be configured to perform MAC address filtering on received packets, process MAC headers of received packets by verifying data integrity, remove preambles and padding, and provide packet content for processing by higher layers. MAC circuitry 1516 can be configured to assemble data to be transmitted into packets, that include destination and source addresses along with network control information and error detection hash values.

Processors 1504 can be any a combination of a: processor, core, graphics processing unit (GPU), field programmable gate array (FPGA), application specific integrated circuit (ASIC), or other programmable hardware device that allow programming of network interface 1500. For example, a "smart network interface" or SmartNIC can provide packet processing capabilities in the network interface using processors 1504.

Packet allocator 1524 can provide distribution of received packets for processing by multiple CPUs or cores using timeslot allocation described herein or RSS. When packet allocator 1524 uses RSS, packet allocator 1524 can calculate a hash or make another determination based on contents of a received packet to determine which CPU or core is to process a packet.

Interrupt coalesce 1522 can perform interrupt moderation whereby network interface interrupt coalesce 1522 waits for multiple packets to arrive, or for a time-out to expire, before generating an interrupt to host system to process received packet(s). Receive Segment Coalescing (RSC) can be performed by network interface 1500 whereby portions of incoming packets are combined into segments of a packet. Network interface 1500 provides this coalesced packet to an application.

Direct memory access (DMA) engine 1552 can copy a packet header, packet payload, and/or descriptor directly from host memory to the network interface or vice versa, instead of copying the packet to an intermediate buffer at the host and then using another copy operation from the intermediate buffer to the destination buffer.

Memory 1510 can be any type of volatile or non-volatile memory device and can store any queue or instructions used to program network interface 1500. Transmit queue 1506 can include data or references to data for transmission by network interface. Receive queue 1508 can include data or references to data that was received by network interface from a network. Descriptor queues 1520 can include descriptors that reference data or packets in transmit queue 1506 or receive queue 1508. Bus interface 1512 can provide an interface with host device (not depicted). For example, bus interface 1512 can be compatible with PCI, PCI Express, PCI-x, Serial ATA, and/or USB compatible interface (although other interconnection standards may be used).

Figure 16:
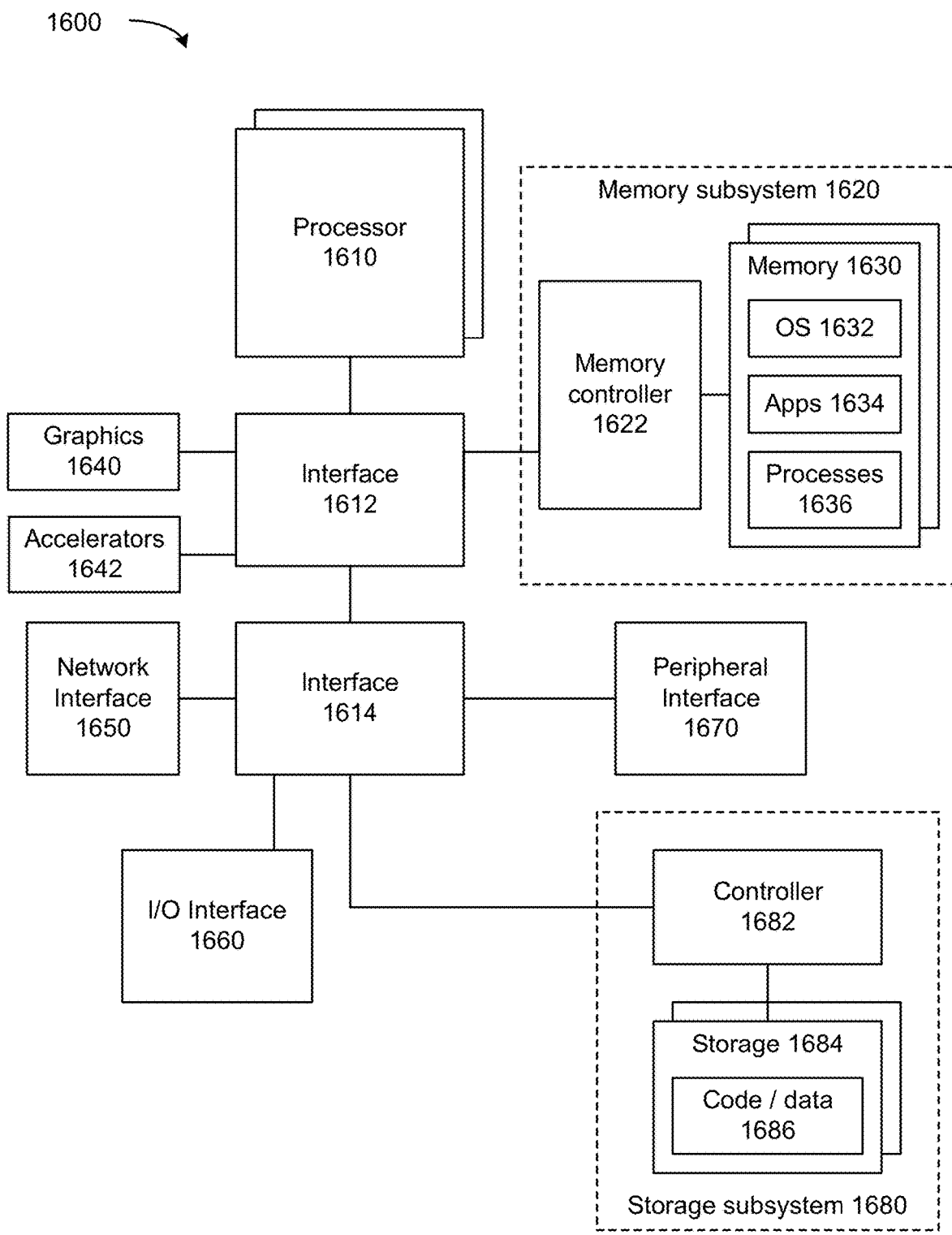
FIG. 16 depicts an example system.

FIG. 16 depicts an example computing system. Various embodiments can use components of system 1600 (e.g., processor 1610, network interface 1650, and so forth) where a network interface device can select a platform to execute a function and potentially cause the function to execute on one or more other nodes to achieve time to completion as described herein. System 1600 includes processor 1610, which provides processing, operation management, and execution of instructions for system 1600. Processor 1610 can include any type of microprocessor, central processing unit (CPU), graphics processing unit (GPU), processing core, or other processing hardware to provide processing for system 1600, or a combination of processors. Processor 1610 controls the overall operation of system 1600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1600 includes interface 1612 coupled to processor 1610, which can represent a higher speed interface or a high throughput interface for system components that needs higher bandwidth connections, such as memory subsystem 1620 or graphics interface components 1640, or accelerators 1642. Interface 1612 represents an interface circuit, which can be a standalone component or integrated onto a processor die. Where present, graphics interface 1640 interfaces to graphics components for providing a visual display to a user of system 1600. In one example, graphics interface 1640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1640 generates a display based on data stored in memory 1630 or based on operations executed by processor 1610 or both. In one example, graphics interface 1640 generates a display based on data stored in memory 1630 or based on operations executed by processor 1610 or both.

Accelerators 1642 can be a fixed function or programmable offload engine that can be accessed or used by a processor 1610. For example, an accelerator among accelerators 1642 can provide compression (DC) capability, cryptography services such as public key encryption (PKE), cipher, hash/authentication capabilities, decryption, or other capabilities or services. In some embodiments, in addition or alternatively, an accelerator among accelerators 1642 provides field select controller capabilities as described herein. In some cases, accelerators 1642 can be integrated into a CPU socket (e.g., a connector to a motherboard or circuit board that includes a CPU and provides an electrical interface with the CPU). For example, accelerators 1642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1620 represents the main memory of system 1600 and provides storage for code to be executed by processor 1610, or data values to be used in executing a routine. Memory subsystem 1620 can include one or more memory devices 1630 such as read-only memory (ROM), flash memory, one or more varieties of random access memory (RAM) such as DRAM, or other memory devices, or a combination of such devices. Memory 1630 stores and hosts, among other things, operating system (OS) 1632 to provide a software platform for execution of instructions in system 1600. Additionally, applications 1634 can execute on the software platform of OS 1632 from memory 1630. Applications 1634 represent programs that have their own operational logic to perform execution of one or more functions. Processes 1636 represent agents or routines that provide auxiliary functions to OS 1632 or one or more applications 1634 or a combination. OS 1632, applications 1634, and processes 1636 provide software logic to provide functions for system 1600. In one example, memory subsystem 1620 includes memory controller 1622, which is a memory controller to generate and issue commands to memory 1630. It will be understood that memory controller 1622 could be a physical part of processor 1610 or a physical part of interface 1612. For example, memory controller 1622 can be an integrated memory controller, integrated onto a circuit with processor 1610.

In some examples, OS 1632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

While not specifically illustrated, it will be understood that system 1600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1600 includes interface 1614, which can be coupled to interface 1612. In one example, interface 1614 represents an interface circuit, which can include standalone components and integrated circuitry. In one example, multiple user interface components or peripheral components, or both, couple to interface 1614. Network interface 1650 provides system 1600 the ability to communicate with remote devices (e.g., servers or other computing devices) over one or more networks. Network interface 1650 can include an Ethernet adapter, wireless interconnection components, cellular network interconnection components, USB (universal serial bus), or other wired or wireless standards-based or proprietary interfaces. Network interface 1650 can transmit data to a device that is in the same data center or rack or a remote device, which can include sending data stored in memory. Network interface 1650 can receive data from a remote device, which can include storing received data into memory. Various examples of network interface 1650 configure one or more network devices and/or nodes to select a platform to execute a function and potentially cause the function to execute on one or more other nodes to achieve time to completion.

In one example, system 1600 includes one or more input/output (I/O) interface(s) 1660. I/O interface 1660 can include one or more interface components through which a user interacts with system 1600 (e.g., audio, alphanumeric, tactile/touch, or other interfacing). Peripheral interface 1670 can include any hardware interface not specifically mentioned above. Peripherals refer generally to devices that connect dependently to system 1600. A dependent connection is one where system 1600 provides the software platform or hardware platform or both on which operation executes, and with which a user interacts.

In one example, system 1600 includes storage subsystem 1680 to store data in a nonvolatile manner. In one example, in certain system implementations, at least certain components of storage 1680 can overlap with components of memory subsystem 1620. Storage subsystem 1680 includes storage device(s) 1684, which can be or include any conventional medium for storing large amounts of data in a nonvolatile manner, such as one or more magnetic, solid state, or optical based disks, or a combination. Storage 1684 holds code or instructions and data 1686 in a persistent state (e.g., the value is retained despite interruption of power to system 1600). Storage 1684 can be generically considered to be a "memory," although memory 1630 is typically the executing or operating memory to provide instructions to processor 1610. Whereas storage 1684 is nonvolatile, memory 1630 can include volatile memory (e.g., the value or state of the data is indeterminate if power is interrupted to system 1600). In one example, storage subsystem 1680 includes controller 1682 to interface with storage 1684. In one example controller 1682 is a physical part of interface 1614 or processor 1610 or can include circuits or logic in both processor 1610 and interface 1614.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1600. More specifically, power source typically interfaces to one or multiple power supplies in system 1600 to provide power to the components of system 1600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMB A) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An embodiment of the devices, systems, and methods may include one or more, and combination of, the examples described below.

Example 1 includes one or more examples and includes an apparatus comprising: a network interface device comprising circuitry, when operational, to select a platform to execute a function and based on load of the platform, selectively cause the function to execute on one or more other platforms to attempt to achieve or finish before a time-to-completion associated with the function.

Example 2 includes one or more examples, wherein the circuitry is to detect progress of function execution to determine whether completion of execution of the function is predicted to not finish within the time-to-completion and cause the function to execute on one or more other platforms based on completion of execution of the function predicted to not finish within the time-to-completion.

Example 3 includes one or more examples, wherein the circuitry is to select the one or more other platforms to execute the function based on one or more of: processor computing utilization, available memory capacity, available cache capacity, network availability, or malfunction of a processor, memory, and/or cache.

Example 4 includes one or more examples, wherein the circuitry is to select the one or more other platforms to execute the function based on one or more prior completion times of the function at the one or more other platforms.

Example 5 includes one or more examples, wherein the platform is coupled to the network interface device using a device interface and wherein the circuitry is to cause the function to also execute on one or more other platforms to attempt to achieve or finish before the time-to-completion.

Example 6 includes one or more examples, wherein the circuitry is to permit the function to execute at the platform; receive a result from execution of the function on the one or more other platforms before a result from execution of the function at the platform; and provide the result from execution of the function on the one or more other platforms to a requester of execution of the function.

Example 7 includes one or more examples, wherein the circuitry is to receive a result from execution of the function on the platform before a result from execution of the function at the one or more other platforms and provide the result from execution of the function on the platform to a requester of execution of the function.

Example 8 includes one or more examples, wherein the circuitry is to for a first available result among multiple executions of the function, provide the first available result for access by another function or to a requester of execution of the function.

Example 9 includes one or more examples, wherein the network interface device comprises one or more of: network interface controller (NIC), SmartNIC, router, switch, forwarding element, infrastructure processing unit (IPU), or data processing unit (DPU).

Example 10 includes one or more examples, and includes a computer-readable medium comprising instructions stored thereon, that if executed by one or more processors, cause the one or more processors to: configure a network interface device, when operational, to select a platform to execute a function and based on load of the platform, selectively cause the function to execute on one or more other platforms to attempt to achieve or finish before a time-to-completion associated with the function.

Example 11 includes one or more examples, wherein the network interface device is configured to: detect progress of function execution to determine whether completion of execution of the function is predicted to not finish within the time-to-completion and cause the function to execute on one or more other platforms based on completion of execution of the function predicted to not finish within the time-to-completion.

Example 12 includes one or more examples, wherein the progress of the function is indicated in one or more registers or memory regions accessible to the network interface device.

Example 13 includes one or more examples, wherein the network interface device is configured to select the one or more other platforms to execute the function based on one or more of: processor computing utilization, available memory capacity, available cache capacity, network availability, or malfunction of a processor, memory, and/or cache.

Example 14 includes one or more examples, wherein the network interface device is configured to select the one or more other platforms to execute the function based on one or more prior completion times of the function at the one or more other platforms.

Example 15 includes one or more examples, wherein the network interface device is configured to for a first available result among multiple executions of the function, provide the first available result for access by another function or to a requester of execution of the function.

Example 16 includes one or more examples, and includes a method comprising: at a network interface device: selecting a platform to execute a function and based on load of the platform, selectively causing the function to execute on one or more other platforms to attempt to achieve or finish before a time-to-completion associated with the function.

Example 17 includes one or more examples, and includes at the network interface device: detecting progress of function execution to determine whether completion of execution of the function is predicted to not finish within the time-to-completion and causing the function to execute on one or more other platforms based on completion of execution of the function predicted to not finish within the time-to-completion.

Example 18 includes one or more examples, and includes: at the network interface device: selecting the one or more other platforms to execute the function based on one or more of: processor computing utilization, available memory capacity, available cache capacity, network availability, or malfunction of a processor, memory, and/or cache.

Example 19 includes one or more examples, and includes: at the network interface device: selecting the one or more other platforms to execute the function based on one or more prior completion times of the function at the one or more other platforms.

Example 20 includes one or more examples, wherein the network interface device comprises one or more of: network interface controller (NIC), SmartNIC, router, switch, forwarding element, infrastructure processing unit (IPU), or data processing unit (DPU).

The invention claimed is:

1. An apparatus comprising:
a network interface device comprising:
a network interface;
a host interface;
a direct memory access (DMA) circuitry; and
circuitry, when operational, to:
select a processor to execute a function,
detect progress of execution of the function to determine whether completion of execution of the function is predicted to not finish within an associated time to completion, and
selectively cause the function to execute on one or more other processors based on completion of execution of the function by the selected processor predicted to not finish within the time to completion to attempt to finish at or before a time to completion associated with the function.

2. The apparatus of claim 1, wherein the circuitry is to select the one or more other processors to execute the function based on one or more of: processor computing utilization, available memory capacity, available cache capacity, network availability, or malfunction of a processor, memory capacity, and/or cache capacity.

3. The apparatus of claim 1, wherein the circuitry is to select the one or more other processors to execute the function based on one or more prior completion times of other executions of the function at the one or more other processors.

4. The apparatus of claim 1, wherein the processor is coupled to the network interface device using a device interface and wherein the circuitry is to cause the function to also execute on the one or more other processors to attempt to finish at or finish before the time to completion.

5. The apparatus of claim 4, wherein the circuitry is to permit the function to execute at the processor;
receive a result from execution of the function on the one or more other processors before a result from execution of the function at the processor; and
provide the result from execution of the function on the one or more other processors to a requester of execution of the function.

6. The apparatus of claim 4, wherein the circuitry is to receive a result from execution of the function on the processor before a result from execution of the function at the one or more other processors and
provide the result from execution of the function on the processor to a requester of execution of the function.

7. The apparatus of claim 1, wherein the circuitry is to for a first available result among multiple executions of the function, provide the first available result for access by another function or to a requester of execution of the function.

8. The apparatus of claim 1, wherein the network interface device comprises one or more of: network interface controller (NIC), SmartNIC, router, switch, forwarding element, infrastructure processing unit (IPU), or data processing unit (DPU).

9. The apparatus of claim 1, wherein the circuitry is to:
select the one or more other processors to execute the function based on one or more prior completion times of other executions of the function at the one or more other processors,
permit the function to execute at the processor;
receive a result from execution of the function on the one or more other processors before a result from execution of the function at the processor;
provide the result from execution of the function on the one or more other processors to a requester of execution of the function;
receive a result from execution of the function on the processor before a result from execution of the function at the one or more other processor; and
provide the result from execution of the function on the processor to a requester of execution of the function.

10. At least one non-transitory computer-readable medium comprising instructions stored thereon, that if executed by one or more processors, cause the one or more processors to:
configure a network interface device, when operational, to:
select a processor to execute a function,
detect progress of execution of the function to determine whether completion of execution of the function by the selected processor is predicted to not finish within a time to completion for the function, and
selectively cause the function to execute on one or more other processors based on completion of execution of the function predicted to not finish within the time to completion, wherein the network interface device comprises: a network interface, a host interface, or a direct memory access (DMA) circuitry.

11. The computer-readable medium of claim 10, wherein the progress of the function is indicated in one or more registers or memory regions accessible to the network interface device.

12. The computer-readable medium of claim 10, wherein the network interface device is configured to select the one or more other processors to execute the function based on one or more of: processor computing utilization, available memory capacity, available cache capacity, network availability, or malfunction of a processor, memory capacity, and/or cache capacity.

13. The computer-readable medium of claim 10, wherein the network interface device is configured to select the one or more other processors to execute the function based on one or more prior completion times of other executions of the function at the one or more other processors.

14. The computer-readable medium of claim 10, wherein the network interface device is configured to
for a first available result among multiple executions of the function, provide the first available result for access by another function or to a requester of execution of the function.

15. The computer-readable medium of claim 10, wherein the network interface device is configured to:
permit the function to execute at the processor;
receive a result from execution of the function on the one or more other processors before a result from execution of the function at the processor;
provide the result from execution of the function on the one or more other processors to a requester of execution of the function;
receive a result from execution of the function on the processor before a result from execution of the function at the one or more other processors;
provide the result from execution of the function on the processor to a requester of execution of the function; and
for a first available result among multiple executions of the function, provide the first available result for access by another function or to a requester of execution of the function.

16. A method comprising:
at a network interface device:
selecting a processor to execute a function,
detecting progress of execution of the function to determine whether completion of execution of the function is predicted to not finish within a time to completion associated with the function, and
selectively causing the function to execute on one or more other processors based on completion of execution of the function by the selected processor predicted to not finish within the time to completion, wherein the network interface device comprises: a network interface, a host interface, or a direct memory access (DMA) circuitry.

17. The method of claim 16, comprising:
at the network interface device:
selecting the one or more other processors to execute the function based on one or more of: processor computing utilization, available memory capacity, available cache capacity, network availability, or malfunction of a processor, memory capacity, and/or cache capacity.

18. The method of claim 16, comprising:
at the network interface device:
selecting the one or more other processors to execute the function based on one or more prior completion times of the function at the one or more other processors.

19. The method of claim 16, wherein the network interface device comprises one or more of: network interface controller (NIC), SmartNIC, router, switch, forwarding element, infrastructure processing unit (IPU), or data processing unit (DPU).

20. The method of claim 16, comprising:
at the network interface device:
receive a result from execution of the function on the processor before a result from execution of the function at the one or more other processors;
provide the result from execution of the function on the processor to a requester of execution of the function; and
for a first available result among multiple executions of the function, provide the first available result for access by another function or to a requester of execution of the function.

* * * * *